US012762419B2

(12) United States Patent
Wu

(10) Patent No.: US 12,762,419 B2
(45) Date of Patent: Oct. 13, 2026

(54) PRIVACY-PRESERVING GRAPHICAL MODEL TRAINING METHODS, APPARATUSES, AND DEVICES

(71) Applicant: Alipay (Hangzhou) Information Technology Co., Ltd., Hangzhou (CN)

(72) Inventor: Ruofan Wu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 484 days.

(21) Appl. No.: 18/523,090

(22) Filed: Nov. 29, 2023

(65) Prior Publication Data

US 2024/0095538 A1 Mar. 21, 2024

Related U.S. Application Data

(63) Continuation of application No. PCT/CN2022/100660, filed on Jun. 23, 2022.

(30) Foreign Application Priority Data

Jul. 15, 2021 (CN) ........................ 202110801373.9

(51) Int. Cl.
*G06N 3/09* (2023.01)

(52) U.S. Cl.
CPC ..................................... *G06N 3/09* (2023.01)

(58) Field of Classification Search
CPC ....................................................... G06N 3/09
See application file for complete search history.

(56) References Cited

U.S. PATENT DOCUMENTS 11,934,555 B2 * 3/2024 Yoo ..................... G06F 21/6245
2007/0005341 A1 * 1/2007 Burges .................. G06F 16/355 704/9

(Continued)

FOREIGN PATENT DOCUMENTS

CN 109033846 12/2018
CN 111178524 5/2020

(Continued)

OTHER PUBLICATIONS

Wu et al., "FedGNN: Federated Graph Neural Network for Privacy-Preserving Recommendation," CoRR, Submitted on Mar. 1, 2021, arXiv:2102.04925v2, 9 pages.

(Continued)

*Primary Examiner* — David E Choi
(74) *Attorney, Agent, or Firm* — Fish & Richardson P.C.

(57) ABSTRACT

Some embodiments of this specification disclose graphical model training methods, apparatuses, and devices. In an embodiment, a method performed by a terminal device includes: acquiring node information of a first graph to be constructed, node information of a second graph and node connection information of the second graph, acquiring a latent vector of a first node that has training label information in the first graph, acquiring latent vectors of the second node and the node in the second graph. performing, based on the first sample data and the second sample data, model training on a graphical model sent by a server, acquiring gradient information corresponding to the trained graphical model, and sending the gradient information to the server for (Continued)

the server to update model parameters in the graphical model based on gradient information provided by different terminal devices to obtain an updated graphical model.

20 Claims, 10 Drawing Sheets

(56) References Cited

U.S. PATENT DOCUMENTS

| | | | | |
|---|---|---|---|---|
| 2016/0226800 | A1 | 8/2016 | Alo et al. | |
| 2019/0026608 | A1 | 1/2019 | Hsieh et al. | |
| 2019/0042917 | A1* | 2/2019 | Gurwicz | G06F 16/9024 |
| 2019/0287022 | A1* | 9/2019 | Zhang | G06N 20/00 |
| 2020/0143080 | A1 | 5/2020 | Wang et al. | |
| 2022/0138502 | A1* | 5/2022 | Li | G06N 3/0475 706/15 |
| 2023/0023520 | A1* | 1/2023 | Cheng | G06N 3/045 |
| 2023/0075100 | A1* | 3/2023 | Zavoronkovs | G06N 3/045 |
| 2023/0359868 | A1* | 11/2023 | Zhang | G06N 3/045 |
| 2024/0045993 | A1* | 2/2024 | Wu | G06F 21/6245 |
| 2024/0111988 | A1* | 4/2024 | Shrivastava | G06N 3/08 |
| 2024/0112000 | A1* | 4/2024 | Shrivastava | G06N 3/08 |
| 2024/0152649 | A1* | 5/2024 | Kao | G06F 21/6245 |
| 2024/0338559 | A1* | 10/2024 | Zhang | G06N 3/042 |
| 2024/0419995 | A1* | 12/2024 | Chajewska | G06N 5/022 |
| 2024/0427821 | A1* | 12/2024 | Zhao | G06F 18/22 |
| 2025/0094824 | A1* | 3/2025 | Shrivastava | G06N 3/098 |

FOREIGN PATENT DOCUMENTS

| | | | |
|---|---|---|---|
| CN | 111291190 | A | 6/2020 |
| CN | 111325352 | | 6/2020 |
| CN | 111369258 | A | 7/2020 |
| CN | 111552986 | | 8/2020 |
| CN | 111582505 | A | 8/2020 |
| CN | 111814977 | A | 10/2020 |
| CN | 112015749 | | 12/2020 |
| CN | 112052942 | A | 12/2020 |
| CN | 112200266 | A | 1/2021 |
| CN | 112364919 | | 2/2021 |
| CN | 112464292 | A | 3/2021 |
| CN | 112541575 | | 3/2021 |
| CN | 112734034 | A | 4/2021 |
| CN | 112800468 | A | 5/2021 |
| CN | 113011282 | | 6/2021 |
| CN | 113361658 | | 9/2021 |
| CN | 116186782 | | 5/2023 |
| WO | 2020114122 | A1 | 6/2020 |
| WO | 2021114931 | A1 | 6/2021 |

OTHER PUBLICATIONS

Bhowmick et al., "Protection against reconstruction and its applications in private federated learning," CoRR, submitted on Jun. 3, 2019, arXiv:1812.00984v2, 45 pages.
Chami et al., "Machine Learning on Graphs: A Model and Comprehensive Taxonomy," CoRR, submitted on Apr. 12, 2022, arXiv:2005.03675v3, 49 pages.
Crosby et al., "BlockChain Technology: Beyond Bitcoin," Sutardja Center for Entrepreneurship & Technology Technical Report, Oct. 16, 2015, 35 pages.
Dwork et al., "The algorithmic foundations of differential privacy," Foundations and Trends® in Theoretical Computer Science, Aug. 10, 2014, 9(3-4):211-407.
Huang et al., "Instahide: Instance-hiding schemes for private distributed learning," In Iternational Conference on Machine Learning, PMLR, 2020, 12 pages.
Huang et al., "Texthide: Tackling data privacy in language understanding tasks," CoRR, submitted on Oct. 12, 2020, arXiv:2010.06053v1, 15 pages.
International Preliminary Report on Patentability in Appln. No. PCT/CN2022/100660, mailed on Jan. 25, 2024, 12 pages.
International Search Report and Written Opinion in Appln. No. PCT/CN2022/100660, mailed on Aug. 26, 2022, 14 pages.
Kairouz et al., "Advances and open problems in federated learning," CoRR, submitted on Mar. 9, 2021, arXiv:1912.04977v3, 121 pages.
Nakamoto, "Bitcoin: A Peer-to-Peer Electronic Cash System," www.bitcoin.org, 2008, 9 pages.
Sajadmanesh et al., "When Differential Privacy Meets Graph Neural Networks," CoRR, submitted on Jun. 30, 2020, arXiv:2006.05535v3, 19 pages.
Verma et al., ""GraphMix: Improved Training of GNNs forSemi-Supervised Learning,"" CoRR, submitted on Oct. 8, 2020, arXiv:1909.11715v3, 21 pages.
Verma et al., "Manifold mixup: Better representations by interpolating hidden states," In International conference on machine learning, May 24, 2019, p. 6438-6447.
Wang et al., "GraphFL: A Federated Learning Framework for Semi-Supervised Node Classification on Graphs," CoRR, submitted on Dec. 8, 2020, arXiv:2012.04187v1, 18 pages.
Zhang et al., "mixup: Beyond empirical risk minimization," CoRR, submitted on Apr. 27, 2018, arXiv:1710.09412v2, 13 pages.
Zhou et al., "Privacy-preserving graph neural network for node classification," CoRR, submitted on May 25, 2020, arXiv:2005.11903v1, 18 pages.
Zhu et al., "Deep leakage from gradients." Federated Learning, Springer, Cham, 2020, p. 17-31 (abstract only).

* cited by examiner

PRIVACY-PRESERVING GRAPHICAL MODEL TRAINING METHODS, APPARATUSES, AND DEVICES

CROSS-REFERENCE TO RELATED APPLICATIONS

This application is a continuation of PCT Application No. PCT/CN2022/100660, filed on Jun. 23, 2022, which claims priority to Chinese Patent Application No. 202110801373.9, filed on Jul. 15, 2021, and each application is hereby incorporated by reference in its entirety.

TECHNICAL FIELD

This specification relates to the field of computer technologies, and in particular, to privacy-preserving graphical model training methods, apparatuses, and devices.

BACKGROUND

In a big data or artificial intelligence application scenario, many tasks need to use user data to train a model, and personal privacy data of a user may be leaked because of a process of personal data transmission. Therefore, how to construct a reasonable privacy-preserving machine learning framework is one of the most important topics at present.

Federated learning is one of the most important branches of distributed learning at present. In federated learning, a user exchanges a model gradient with a server (data user), thereby avoiding directly transmitting raw privacy data of the user. In comparison with centralized machine learning, federated learning implements data isolation, thereby ensuring user privacy to some extent. As graph learning is widely used in the industrial community and is booming in the academic community, federated graph learning has an important application prospect. However, a current federated learning protocol cannot ensure security of user privacy. The reason is that in some special machine learning models, the raw privacy data of the user can be directly decoded by intercepting transmitted gradient information. Therefore, it is necessary to provide a federated learning framework that can better protect user privacy data.

SUMMARY

An objective of some embodiments of this specification is to provide a federated learning framework that can better protect user privacy data.

To implement the above-mentioned technical solutions, some embodiments of this specification are implemented as follows: Some embodiments of this specification provide a privacy-preserving graphical model training method, applied to a terminal device, where the method includes: acquiring node information of a to-be-constructed first graph, and node information and node connection information of a second graph; constructing the first graph by using a predetermined fully connected network based on the node information of the first graph, and constructing the second graph by using a predetermined graph network based on the node information and the node connection information of the second graph, where the fully connected network and the graph network have same network parameters; acquiring a latent vector of a first node that has training label information in the first graph, and constructing first sample data by using a predetermined InstaHide privacy protection rule based on the latent vector of the first node and the training label information corresponding to the first node; respectively generating corresponding training label information for a second node that does not have training label information in the first graph and a node in the second graph, acquiring latent vectors of the second node and the node in the second graph, and constructing second sample data by using the predetermined InstaHide privacy protection rule based on the latent vectors of the second node and the node in the second graph and the generated training label information; and performing, based on the first sample data and the second sample data, model training on a graphical model sent by a server, acquiring gradient information corresponding to the trained graphical model, and sending the gradient information to the server such that the server updates model parameters in the graphical model in the server based on gradient information provided by different terminal devices to obtain an updated graphical model.

Some embodiments of this specification provide a privacy-preserving graphical model training method, applied to a server, where the method includes: receiving gradient information corresponding to a graphical model sent by a plurality of different terminal devices, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; updating model parameters in the graphical model based on the gradient information corresponding to the graphical model sent by the plurality of different terminal devices to obtain an updated graphical model; and sending the updated graphical model to the terminal device such that the terminal device performs corresponding service processing based on the updated graphical model.

Some embodiments of this specification provide a privacy-preserving graphical model training method, applied to a blockchain system, where the method includes: sending a model parameter of a graphical model to a plurality of different terminal devices in a federated learning framework based on a smart contract pre-deployed in the blockchain system, where the smart contract is used to trigger federated learning processing; respectively acquiring gradient information corresponding to the graphical model from the plurality of different terminal devices based on the smart contract, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; updating the model parameters in the graphical model based on the gradient information corresponding to the graphical model sent by the plurality of different terminal devices and the smart contract to obtain the updated graphical model; and providing the updated graphical model to the terminal device such that the terminal device performs corresponding service processing based on the updated graphical model.

Some embodiments of this specification provide a privacy-preserving graphical model training apparatus, where the apparatus includes: an information acquisition module, configured to acquire node information of a to-be-constructed first graph, and node information and node connection information of a second graph; a graph constructing module, configured to construct the first graph by using a predetermined fully connected network based on the node information of the first graph, and construct the second graph by using a predetermined graph network based on the node information and the node connection information of the second graph, where the fully connected network and the graph network have same network parameters; a first sample constructing module, configured to acquire a latent vector of a first node that has training label information in the first graph, and construct first sample data by using a predetermined InstaHide privacy protection rule based on the latent vector of the first node and the training label information corresponding to the first node; a second sample constructing module, configured to respectively generate corresponding training label information for a second node that does not have training label information in the first graph and a node in the second graph, acquire latent vectors of the second node and the node in the second graph, and construct second sample data by using the predetermined InstaHide privacy protection rule based on the latent vectors of the second node and the node in the second graph and the generated training label information; and a gradient determination module, configured to perform, based on the first sample data and the second sample data, model training on a graphical model sent by a server, acquire gradient information corresponding to the trained graphical model, and send the gradient information to the server such that the server updates model parameters in the graphical model in the server based on gradient information provided by different terminal devices to obtain an updated graphical model.

Some embodiments of this specification provide a privacy-preserving graphical model training apparatus, where the apparatus includes: a gradient receiving module, configured to receive gradient information corresponding to a graphical model sent by a plurality of different terminal devices, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; a model parameter updating module, configured to update model parameters in the graphical model based on the gradient information corresponding to the graphical model sent by the plurality of different terminal devices to obtain an updated graphical model; and a sending module, configured to send the updated graphical model to the terminal device such that the terminal device performs corresponding service processing based on the updated graphical model.

Some embodiments of this specification provide a privacy-preserving graphical model training apparatus, where the apparatus is an apparatus in a blockchain system, and the apparatus includes: a model parameter sending module, configured to send a model parameter of a graphical model to a plurality of different terminal devices in a federated learning framework based on a smart contract pre-deployed in the blockchain system, where the smart contract is used to trigger federated learning processing; a gradient acquisition module, configured to respectively acquire gradient information corresponding to the graphical model from the plurality of different terminal devices based on the smart contract, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; a model parameter updating module, configured to update model parameters in the graphical model based on the gradient information corresponding to the graphical model sent by the plurality of different terminal devices and the smart contract to obtain an updated graphical model; and an information providing module, configured to provide the updated graphical model to the terminal device such that the terminal device performs corresponding service processing based on the updated graphical model.

Some embodiments of this specification provide a privacy-preserving graphical model training device, including a processor and a memory configured to store a computer-executable instruction, where when being executed, the executable instruction enables the processor to perform the following operations: acquiring node information of a to-be-constructed first graph, and node information and node connection information of a second graph; constructing the first graph by using a predetermined fully connected network based on the node information of the first graph, and constructing the second graph by using a predetermined graph network based on the node information and the node connection information of the second graph, where the fully connected network and the graph network have same network parameters; acquiring a latent vector of a first node that has training label information in the first graph, and constructing first sample data by using a predetermined InstaHide privacy protection rule based on the latent vector of the first node and the training label information corresponding to the first node; respectively generating corresponding training label information for a second node that does not have training label information in the first graph and a node in the second graph, acquiring latent vectors of the second node and the node in the second graph, and constructing second sample data by using the predetermined InstaHide privacy protection rule based on the latent vectors of the second node and the node in the second graph and the generated training label information; and performing, based on the first sample data and the second sample data, model training on a graphical model sent by a server, acquiring gradient information corresponding to the trained graphical model, and sending the gradient information to the server such that the server updates model parameters in the graphical model in the server based on gradient information provided by different terminal devices to obtain an updated graphical model.

Some embodiments of this specification provide a privacy-preserving graphical model training device, including a processor and a memory configured to store a computer-executable instruction, where when being executed, the executable instruction enables the processor to perform the following operations: receiving gradient information corresponding to a graphical model sent by a plurality of different terminal devices, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; updating model parameters in the graphical model based on the gradient information corresponding to the graphical model sent by the plurality of different terminal devices to obtain an updated graphical model; and sending the updated graphical model to the terminal device such that the terminal device performs corresponding service processing based on the updated graphical model.

Some embodiments of this specification provide a privacy-preserving graphical model training device, where the device is a device in a blockchain system, and the privacy-preserving graphical model training device includes: a processor and a memory configured to store a computer-executable instruction, where when being executed, the executable instruction enables the processor to perform the following operations: sending a model parameter of a graphical model to a plurality of different terminal devices in a federated learning framework based on a smart contract pre-deployed in the blockchain system, where the smart contract is used to trigger federated learning processing; respectively acquiring gradient information corresponding to the graphical model from the plurality of different terminal devices based on the smart contract, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; updating the model parameters in the graphical model based on the gradient information corresponding to the graphical model sent by the plurality of different terminal devices and the smart contract to obtain the updated graphical model; and providing the updated graphical model to the terminal device such that the terminal device performs corresponding service processing based on the updated graphical model.

Some embodiments of this specification further provide a storage medium, where the storage medium is configured to store a computer-executable instruction, and the executable instruction is executed to implement the following procedure: acquiring node information of a to-be-constructed first graph, and node information and node connection information of a second graph; constructing the first graph by using a predetermined fully connected network based on the node information of the first graph, and constructing the second graph by using a predetermined graph network based on the node information and the node connection information of the second graph, where the fully connected network and the graph network have same network parameters; acquiring a latent vector of a first node that has training label information in the first graph, and constructing first sample data by using a predetermined InstaHide privacy protection rule based on the latent vector of the first node and the training label information corresponding to the first node; respectively generating corresponding training label information for a second node that does not have training label information in the first graph and a node in the second graph, acquiring latent vectors of the second node and the node in the second graph, and constructing second sample data by using the predetermined InstaHide privacy protection rule based on the latent vectors of the second node and the node in the second graph and the generated training label information; and performing, based on the first sample data and the second sample data, model training on a graphical model sent by a server, acquiring gradient information corresponding to the trained graphical model, and sending the gradient information to the server such that the server updates model parameters in the graphical model in the server based on gradient information provided by different terminal devices to obtain an updated graphical model.

Some embodiments of this specification further provide a storage medium, where the storage medium is configured to store a computer-executable instruction, and the executable instruction is executed to implement the following procedure: receiving gradient information corresponding to a graphical model sent by a plurality of different terminal devices, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; updating model parameters in the graphical model based on the gradient information corresponding to the graphical model sent by the plurality of different terminal devices to obtain an updated graphical model; and sending the updated graphical model to the terminal device such that the terminal device performs corresponding service processing based on the updated graphical model.

Some embodiments of this specification further provide a storage medium, where the storage medium is configured to store a computer-executable instruction, and the executable instruction is executed to implement the following procedure: sending a model parameter of a graphical model to a plurality of different terminal devices in a federated learning framework based on a smart contract pre-deployed in the blockchain system, where the smart contract is used to trigger federated learning processing; respectively acquiring gradient information corresponding to the graphical model from the plurality of different terminal devices based on the smart contract, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; updating the model parameters in the graphical model based on the gradient information corresponding to the graphical model sent by the plurality of different terminal devices and the smart contract to obtain the updated graphical model; and providing the updated graphical model to the terminal device such that the terminal device performs corresponding service processing based on the updated graphical model.

DESCRIPTION OF EMBODIMENTS

Some embodiments of this specification provide privacy-preserving graphical model training methods, apparatuses, and devices.

Embodiment 1

Figure 1A:
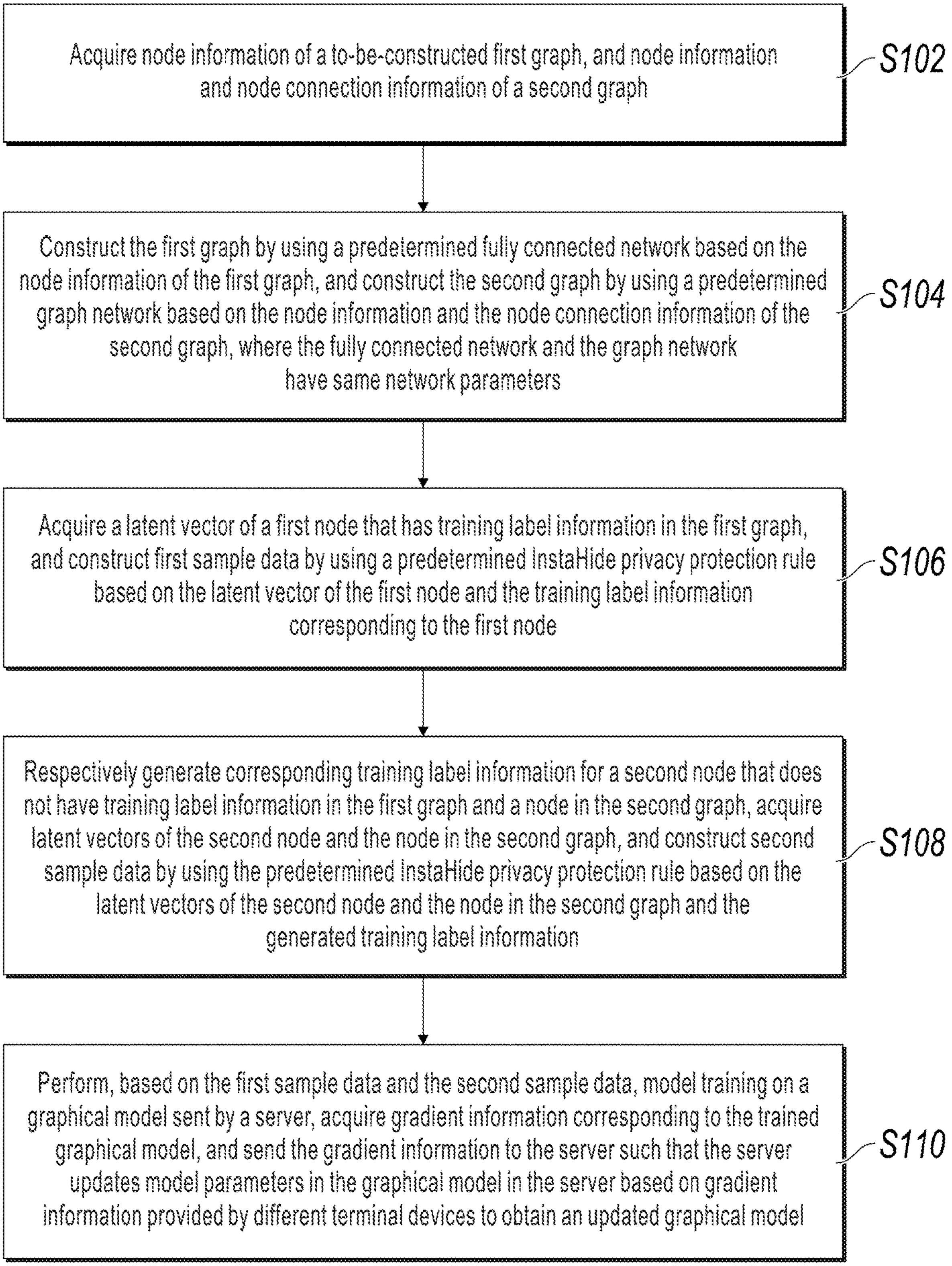
FIG. 1A shows some embodiments of a privacy-preserving graphical model training method, according to this specification.
Figure 1B:
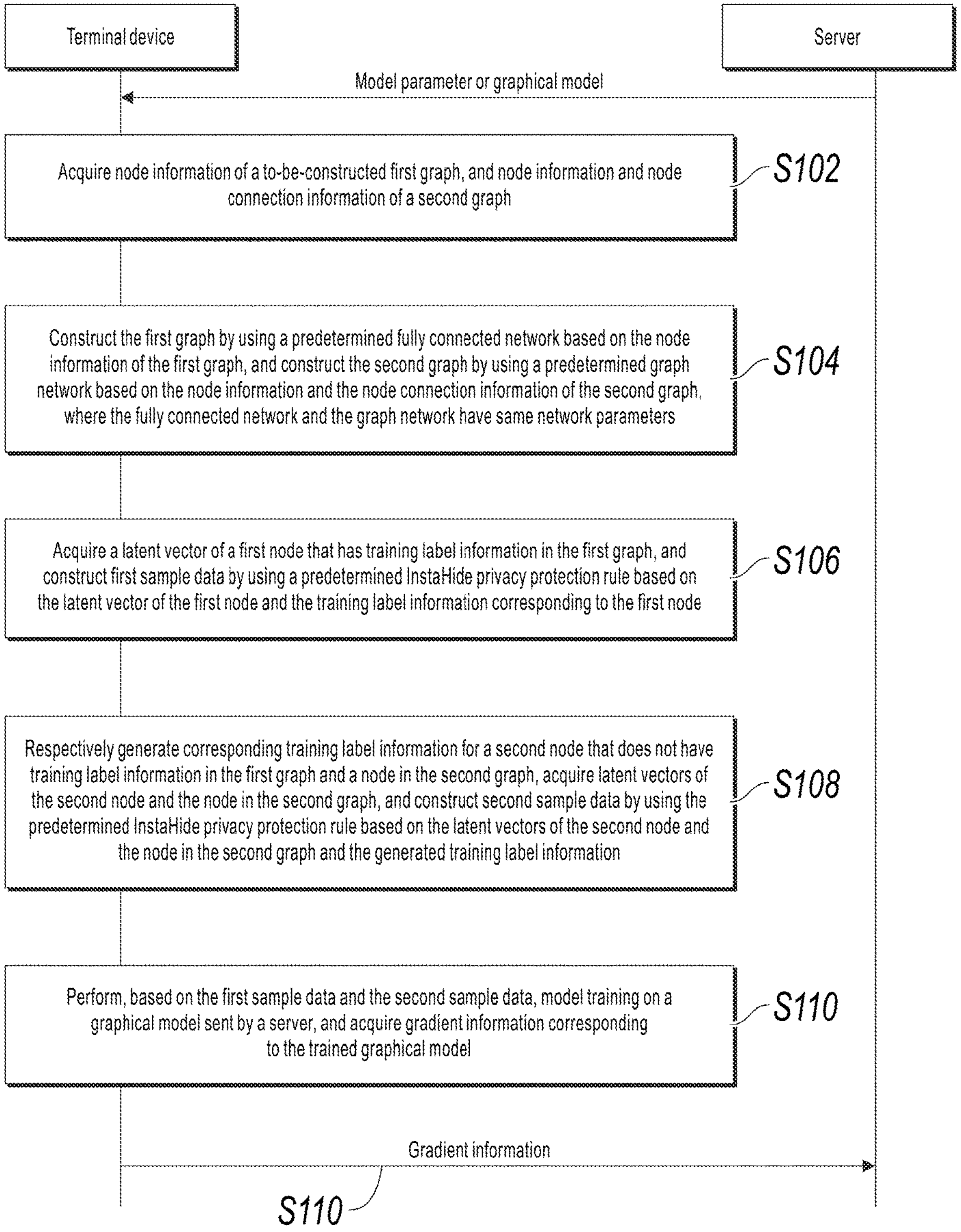
FIG. 1B is a schematic diagram illustrating a processing procedure of privacy-preserving graphical model training, according to this specification.

As shown in FIG. 1A and FIG. 1B, some embodiments of this specification provide a privacy-preserving graphical model training method. The method can be performed by a terminal device, and the terminal device can be, for example, a mobile phone, a tablet computer, a personal computer, etc. The method can specifically include the following steps: Step S102: Acquire node information of a to-be-constructed first graph, and node information and node connection information of a second graph.

The first graph and the second graph can be one type of data structure, the first graph and the second graph can be graphs, and so on. In some embodiments, the first graph and the second graph can be attribute graphs, and the attribute graph can be a relationship diagram that includes a node, an edge, a label, a relationship type, and an attribute. In the attribute graph, an edge can also be referred to as a relationship, and a node and a relationship are most important entities. A node of the attribute graph exists independently, a label can be set for a node, and nodes having the same label belong to one group or one set. Relationships can be grouped using a relationship type, and relationships of the same relationship type belong to one set. A relationship can be directional, and two ends of the relationship are a start node and an end node. A directed arrow is used to identify a direction, and a bidirectional relationship between nodes is identified using two relationships with opposite directions. Any node can have zero, one, or more labels. However, a relationship type needs to be set for a relationship, and only one relationship type can be set. The node information can include information such as an identifier (such as a node ID or a name) of a node, an attribute of the node, and a label of the node. Details can be set based on an actual situation, which is not limited in some embodiments of this specification. The node connection information can be a relationship in the above-mentioned attribute graph, and can be used to connect two nodes, and so on. The node connection information can include information about two nodes that have an association relationship (for example, identifiers of the two nodes), information indicating which of the two nodes is a start node and which of the two nodes is an end node, and the like. Details can be set based on an actual situation, which is not limited in some embodiments of this specification.

During implementation, in a big data or artificial intelligence application scenario, many tasks need to use user data to train a model, and personal privacy data of a user may be leaked because of a process of personal data transmission. Therefore, how to construct a reasonable privacy-preserving machine learning framework is one of the most important topics at present.

Figure 2:
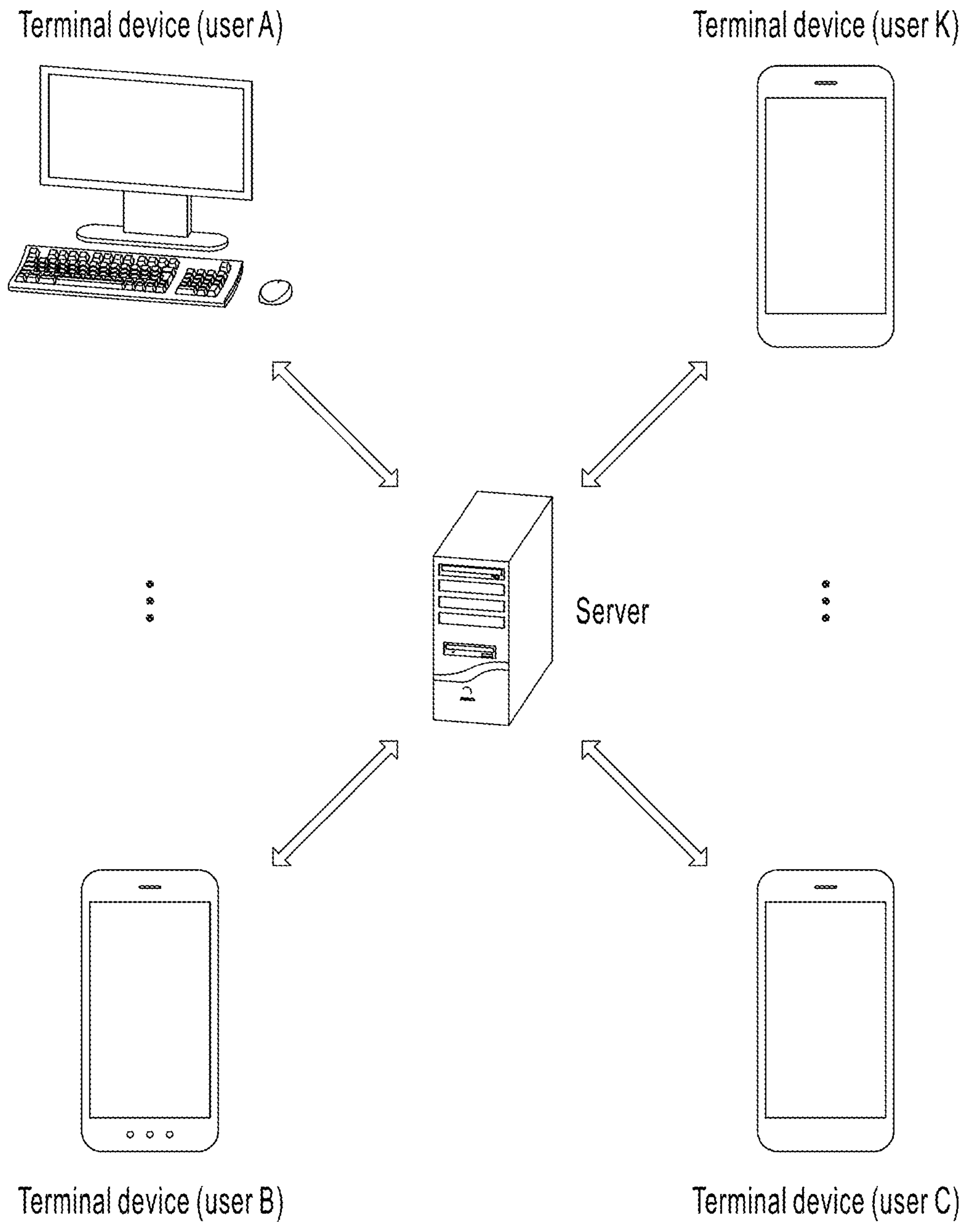
FIG. 2 is a schematic structural diagram illustrating a privacy-preserving graphical model training system, according to this specification.

Federated learning is one of the most important branches of distributed learning at present. In federated learning, a user exchanges a model gradient with a server (data user), thereby avoiding directly transmitting raw privacy data of the user. In comparison with centralized machine learning, federated learning implements data isolation, thereby ensuring user privacy to some extent. As graph learning is widely used in the industrial community and is booming in the academic community, federated graph learning has an important application prospect. However, a current federated learning protocol cannot ensure security of user privacy. The reason is that in some special machine learning models, the raw privacy data of the user can be directly decoded by intercepting transmitted gradient information. Therefore, it is necessary to provide a federated learning framework that can better protect user privacy data. Some embodiments of this specification provide an implementable federated learning framework, which can specifically include the following content: As shown in FIG. 2, a server can construct a model architecture of a graphical model based on a predetermined algorithm. The model architecture can include a to-be-determined model parameter. After constructing the model architecture of the graphical model, the server can send the model architecture of the graphical model to one or more different terminal devices of federated learning based on a federated learning mechanism. In practice, one or more different terminal devices of federated learning can alternatively construct a model architecture of a graphical model based on related information provided by the server (such as information about a used algorithm and the graphical model). In such case, the server only need to send model parameters in the model architecture of the graphical model constructed by the server to each terminal device. After receiving the model parameters, the terminal device can update the model parameters in the constructed model architecture of the graphical model by using the model parameters, so as to obtain a graphical model that has the same model architecture and model parameters as the graphical model in the server. In practice, in addition to using the above-mentioned method to ensure that the server and the terminal device can have the same initial graphical model, a plurality of other methods can also be used for implementation. Details can be set based on an actual situation, which is not limited in some embodiments of this specification.

After obtaining the model architecture of the graphical model, the terminal device can acquire, from data stored in the terminal device, data used to train the graphical model. In practice, the terminal device can store data provided by a user each time, and can use the data as data to train the graphical model. In addition, to compensate for a shortage of data stored in the terminal device, the terminal device can further acquire corresponding data from another device by using a designated method, and can use the data as data to train the graphical model. Details can be set based on an actual situation. The data acquired by the terminal device can include a graph with complete graph information, or can include a graph with incomplete graph information. For ease of subsequent description, the graph with complete graph information can be referred to as a second graph, and there can be one or more second graphs. The graph with incomplete graph information can be referred to as a first graph, and there can be one or more first graphs, and so on. Details can be set based on an actual situation, which is not limited in some embodiments of this specification. In some embodiments of this specification, the to-be-constructed first graph includes node information, but does not include node connection information. The second graph includes node information and node connection information. Based on the above-mentioned description, the terminal device can acquire the node information of the to-be-constructed first graph, and the node information and the node connection information of the second graph.

Step S104: Construct the first graph by using a predetermined fully connected network based on the node information of the first graph, and construct the second graph by using a predetermined graph network based on the node information and the node connection information of the second graph, where the fully connected network and the graph network have same network parameters.

The fully connected network can be a network that has a connection relationship between any two nodes at two adjacent network layers. The fully connected network can include a plurality of network layers. A quantity of network layers included in the fully connected network can be set based on an actual situation, which is not limited in some embodiments of this specification. The graph network can be a network formed by nodes and a connection relationship between the nodes. The graph network can include a plurality of different architectures, such as a knowledge graph and a recurrent neural network. Details can be set based on an actual situation, which is not limited in some embodiments of this specification.

During implementation, the first graph does not include the node connection information. Therefore, to construct the first graph, a network can be pre-selected based on an actual situation to establish a complete first graph. To ensure that information is not omitted in constructing the first graph, a fully connected network can be pre-selected. As such, it can be ensured that there is a connection relationship between any two nodes at two adjacent network layers. Specifically, the nodes in the first graph can be connected using the fully connected network based on the node information of the first graph to obtain the first graph.

In addition, since the second graph includes complete graph information, the second graph can be constructed using a designated graph network. To reduce a difference between graphs that are constructed using different graph networks, or to reduce impact of other factors on a final result, it can be set that the fully connected network and the graph network have the same network parameters. In other words, the above-mentioned two networks can use the same set of network parameters (that is, parameter sharing). The first graph and the second graph are respectively constructed using the above-mentioned method.

Step S106: Acquire a latent vector of a first node that has training label information in the first graph, and construct first sample data by using a predetermined InstaHide privacy protection rule based on the latent vector of the first node and the training label information corresponding to the first node.

The InstaHide privacy protection rule can be a privacy protection rule based on a Mixup mechanism. To be specific, the sample data are mixed with one or more pieces of random sample data by using the Mixup mechanism, thereby significantly increasing difficulty in decoding a single piece of sample data, and achieving a purpose of privacy protection. The Mixup mechanism can be an enhanced processing mechanism for sample data. Specifically, for raw sample data having a training label, an average value can be calculated for a feature and a training label that correspond to each piece of sample data and those corresponding to one or more pieces of other sample data to obtain one or more pieces of sample data processed by the Mixup mechanism. The latent vector can be determined by representation of the sample data. During implementation, for data having training label information (namely, related data corresponding to the first node in the first graph), representation of each first node can be first calculated, that is, a latent vector of the first node having training label information in the first graph is obtained. Based on the latent vector of the first node and the training label information corresponding to the first node, a new data set can be constructed, namely, a data set formed by the latent vector of the first node and the training label information corresponding to the first node, and the constructed new data set can be converted into sample data used to perform model training A privacy protection rule can be predetermined based on an actual situation. In these embodiments, the privacy protection rule can be implemented using the InstaHide privacy protection rule. Specifically, for the data set formed by the latent vector of the first node and the training label information corresponding to the first node, one latent vector can be randomly selected from the latent vector of the first node. Then, one or more latent vectors can be selected from remaining latent vectors, and an average value of the selected latent vectors can be calculated to obtain a corresponding calculation result. Based on the same processing method, the above-mentioned calculation is performed on the remaining latent vectors to respectively obtain a calculation result corresponding to each latent vector (which can be referred to as a first calculation result for ease of subsequent description). For the training label information corresponding to the first node, a calculation result corresponding to the training label information corresponding to each first node can be obtained using the same processing method as the above-mentioned latent vector (which can be referred to as a second calculation result for ease of subsequent description). The first sample data can be determined based on the first calculation result and the second calculation result. For example, the first sample data can be directly constructed using the first calculation result and the second calculation result. Alternatively, designated calculation can be respectively performed on the first calculation result and the second calculation result to respectively obtain a corresponding settlement result, and the first sample data can be determined based on the obtained calculation result.

Step S108: Respectively generate corresponding training label information for a second node that does not have training label information in the first graph and a node in the second graph, acquire latent vectors of the second node and the node in the second graph, and construct second sample data by using the predetermined InstaHide privacy protection rule based on the latent vectors of the second node and the node in the second graph and the generated training label information.

During implementation, since the first graph and the second graph further include a node that does not include training label information, a mechanism for processing training label information can be set in advance for the node. For example, a classification algorithm can be pre-selected, and classification can be respectively performed for the node by using the classification algorithm, and corresponding training label information can be determined based on a corresponding classification result. Alternatively, a machine learning model (for example, a neural network model) can be pre-trained, and corresponding training label information can be determined respectively for the second node that does not include training label information in the first graph and the node in the second graph by using the trained machine learning model. In addition, corresponding training label information can alternatively be generated for the second node and the node in the second graph by using a plurality of other different methods. Details can be set based on an actual situation, which is not limited in some embodiments of this specification.

After the training label information corresponding to the node that does not have training label information is obtained using the above-mentioned method, processing in step S106 can be performed on the node to construct the second sample data. For a specific processing procedure, references can be made to related content in step S106, and details are omitted here for simplicity.

Step S110: Perform, based on the first sample data and the second sample data, model training on a graphical model sent by a server, acquire gradient information corresponding to the trained graphical model, and send the gradient information to the server such that the server updates model parameters in the graphical model in the server based on gradient information provided by different terminal devices to obtain an updated graphical model.

During implementation, after the sample data in the terminal device are obtained using the above-mentioned method, the graphical model sent by the server can be trained using the sample data until the graphical model converges, so as to obtain the trained graphical model. Then, gradient information corresponding to the trained graphical model can be calculated, and the calculated gradient information can be sent to the server. The server can receive gradient information sent by the terminal device. In addition, the server can also receive gradient information that corresponds to a graphical model trained by a corresponding terminal device and that is provided by another terminal device in federated learning. The server can perform integrated processing on the received gradient information, and update a model parameter of the graphical model in the server based on a result of the integrated processing to obtain a final graphical model. Then, the graphical model can be sent to each terminal device in federated learning. The terminal device can perform corresponding service processing by using the updated graphical model, for example, the terminal device can perform protection and control processing on designated risks of an insurance service by using the updated graphical model.

According to the privacy-preserving graphical model training method provided in some embodiments of this specification, the first graph is constructed using the predetermined fully connected network based on the node information of the first graph, and the second graph is constructed using the predetermined graph network based on the node information and the node connection information of the second graph, where the fully connected network and the graph network have the same network parameters; then, the first sample data are constructed using the predetermined InstaHide privacy protection rule based on the latent vector of the first node that has training label information in the first graph and the training label information corresponding to the first node, corresponding training label information is respectively generated for the second node that does not have training label information in the first graph and the node in the second graph, and the second sample data are constructed using the predetermined InstaHide privacy protection rule based on the latent vectors of the second node and the node in the second graph and the generated training label information; and finally, model training can be performed, based on the first sample data and the second sample data, on the graphical model sent by the server, gradient information corresponding to the trained graphical model is acquired, and the gradient information is sent to the server such that the server updates the model parameters in the graphical model in the server based on the gradient information provided by different terminal devices to obtain the updated graphical model. As such, based on the InstaHide privacy protection rule, a reasonable privacy protection level can be provided and model precision is relatively high, thereby drastically increasing difficulty in decoding user privacy data from the gradient information.

Embodiment 2

Figure 3:
FIG. 3 is a schematic diagram illustrating another processing procedure of privacy-preserving graphical model training, according to this specification.

As shown in FIG. 3, some embodiments of this specification provide a privacy-preserving graphical model training method. The method can be performed by a terminal device, and the terminal device can be, for example, a mobile phone, a tablet computer, a personal computer, etc. The method can specifically include the following steps:

Step S302: Acquire node information of a to-be-constructed first graph, and node information and node connection information of a second graph.

The first graph and the second graph can be attribute graphs, for example, an attribute graph G=(V, E), representing a graph of a node set V and an edge set E. If $v \in V$ for each node and one feature $x_v$ is allowed, the graph G is an attribute graph, which can be denoted as G=(V, E, X), where X represents a matrix formed by concatenating features of all nodes. In practice, an adjacency matrix A can be used as an equivalent definition of an edge set, A represents an N*N matrix, N represents a quantity of nodes, and A {ij}=1 represents that there is one edge between a node i and a node j. Otherwise, A {ij}=0.

Step S304: Construct the first graph by using a predetermined fully connected network based on the node information of the first graph, and construct the second graph by using a predetermined graph network based on the node information and the node connection information of the second graph, where the fully connected network and the graph network have same network parameters.

The fully connected network can be a fully convolutional network (FCN), and the graph network can be constructed based on a graph convolutional neural network (GCN), a graph attention network (GAT), or a GraphSAGE.

Step S306: Acquire a latent vector of a first node that has training label information in the first graph.

Step S308: Generate a permutation function and a weight that correspond to the first node based on the latent vector of the first node and the training label information corresponding to the first node.

A sum of weights corresponding to the first node is 1.

During implementation, the permutation function and the weight that correspond to the first node can be determined using the Mixup mechanism. For raw data $\{(x_1, y_1), (x_2, y_2), \ldots, (x_m, y_m)\}$ in the first node, where x represents a feature of the first node and y represents a training label, the feature of the first node can be converted using the Mixup mechanism. Therefore, a permutation function $\pi_i$ and a corresponding weight $\lambda_{i,k}$ can be predetermined, where $1 \le i \le m$ and $\pi_i(i)=i$ is satisfied. In such case, any node (namely, an $i^{th}$ node) can satisfy the following expressions:

$$x_i' = \lambda_{i,1} \times x_{\pi_i(1)} + \lambda_{i,2} \times x_{\pi_i(2)} + \ldots + \lambda_{i,k} \times x_{\pi_i(k)} \quad (1)$$

$$y_i' = \lambda_{i,1} \times y_{\pi_i(1)} + \lambda_{i,2} \times y_{\pi_i(2)} + \ldots + \lambda_{i,k} \times y_{\pi_i(k)} \quad (2)$$

$$\sum_j \lambda_{i,j} = 1 \quad (3)$$

A meaning expressed by the above-mentioned expressions can be as follows: For an $i^{th}$ sample, weighted averaging is performed on the $i^{th}$ sample and k−1 randomly selected samples in terms of the feature and the training label information of the sample data. Then, $$\{(x_1', y_1'), (x_2', y_2'), \ldots, (x_m', y_m')\}$$

can be used as the sample data to train the corresponding model.

Similarly, for the first node in the first graph, corresponding sample data can also be obtained using a method similar to the above-mentioned method. For the first node that has training label information in the first graph, a feature corresponding to each first node can be calculated, and a latent vector $f(x_i)$ can be obtained, where $1 \le i \le L$. In such case, a new data set $\{(f(x_1),y_1), (f(x_2), y_2), \ldots (f(x_L),y_L)\}$ can be obtained, where $f(x_i)$ can be a d-dimensional vector. The following expressions can be obtained using the same method as the above-mentioned formula (1), formula (2), and formula (3):

$$f'_{(x_i)} = \lambda_{i,1} \times f\left(x_{\pi_i(1)}\right) + \lambda_{i,2} \times f\left(x_{\pi_i(2)}\right) + \ldots + \lambda_{i,k} \times f\left(x_{\pi_i(k)}\right) \quad (4)$$

$$y'_i = \lambda_{i,1} \times y_{\pi_i(1)} + \lambda_{i,2} \times y_{\pi_i(2)} + \ldots + \lambda_{i,k} \times y_{\pi_i(k)} \quad (5)$$

$$\sum_j \lambda_{i,j} = 1 \quad (6)$$

The above-mentioned expressions (4), (5), and (6) are solved, and the permutation function $\pi_i$ corresponding to the first node and the corresponding weight $\lambda_{i,k}$ can be finally obtained.

Step S310: Generate first pre-selected sample data based on the permutation function and the weight that correspond to the first node and the latent vector of the first node and the training label information corresponding to the first node.

During implementation, the permutation function and the weight that correspond to each first node can be obtained based on the above-mentioned formula (4), formula (5), and formula (6). Then, based on the latent vector of each first node and the training label information corresponding to the first node, the following expression can be finally obtained:

$$\{(f'_{(x_1)}, y'_1), (f'_{(x_2)}, y'_2), \ldots, (f'_{(x_L)}, y'_L)\} \quad (7)$$

The above-mentioned expression (7) can be the first pre-selected sample data.

Step S312: Generate a node parameter corresponding to the first node, and generate the first sample data based on the node parameter corresponding to the first node and the first pre-selected sample data.

The node parameter can be set based on an actual situation. For example, the node parameter can be a predetermined designated vector, or can be a random vector, etc. Specifically, the node parameter can be set based on an actual situation. Details can be set based on an actual situation, which is not limited in some embodiments of this specification. In these embodiments, the node parameter can be a Rademacher random vector.

During implementation, for each $n \in \{1, 2, \ldots, L\}$, a d-dimensional Rademacher random vector $\sigma=(\sigma_1, \sigma_2, \ldots, \sigma_d)$ is generated, and then multiplied by $f(x_i)$ on a dimension-by-dimension basis to obtain final first sample data.

Step S314: Respectively input node data of the second node that does not have training label information in the first graph and node data of the node in the second graph into a predetermined target graph neural network (GNN) model, to respectively obtain training label information corresponding to the second node that does not have training label information in the first graph and the node in the second graph, where the target GNN model is obtained by performing supervised training based on a predetermined graph sample.

During implementation, to set corresponding training label information for a node that does not have training label information, the target GNN model can be pre-trained. Specifically, sample data (i.e., a graph sample, which can include training label information) that are used to train the above-mentioned target GNN model can be acquired in advance by using a plurality of different methods (for example, purchase or grey box testing). Then, supervised training can be performed on the target GNN model based on the acquired graph sample, so as to finally obtain the trained target GNN model. After the node data of the second node that does not have training label information in the first graph and the node data of the node in the second graph are obtained using the above-mentioned method, the acquired node data can be input into the trained target GNN model, so as to respectively obtain the training label information corresponding to the second node that does not have training label information in the first graph and the node in the second graph.

Step S316: Acquire latent vectors of the second node and the node in the second graph, and construct second sample data by using the predetermined InstaHide privacy protection rule based on the latent vectors of the second node and the node in the second graph and the generated training label information.

During implementation, the latent vectors of the second node and the node in the second graph can be acquired, a permutation function and a weight that correspond to the second node and the node in the second graph are generated for the latent vectors of the second node and the node in the second graph and the generated training label information, second pre-selected sample data are generated based on the permutation function and the weight that correspond to the second node and the node in the second graph and the generated training label information, node parameters corresponding to the second node and the node in the second graph are generated, and the second sample data are generated based on the node parameters corresponding to the second node and the node in the second graph, and the second pre-selected sample data. For a specific processing procedure of the above-mentioned process, references can be made to the above-mentioned related content, and details are omitted here for simplicity.

Step S318: Perform model training on the graphical model based on the first sample data to obtain a function value of a predetermined first classification loss function corresponding to the first sample data.

The graphical model can be constructed based on the graph neural network (GNN). The first classification loss function can include a plurality of types, and can be specifically selected based on an actual situation. For example, the first classification loss function can be a cross-entropy loss function.

Step S320: Perform model training on the graphical model based on the second sample data to obtain a function value of a predetermined second classification loss function corresponding to the second sample data.

The second classification loss function can include a plurality of types, and can be specifically selected based on an actual situation. For example, the second classification loss function can be a cross-entropy loss function. In addition, the first classification loss function can be the same as the second classification loss function. To be specific, the first classification loss function and the second classification loss function are cross-entropy loss functions, etc.

Step S322: Determine a function value of a loss function corresponding to the graphical model based on the function value of the predetermined first classification loss function corresponding to the first sample data and the function value of the predetermined second classification loss function corresponding to the second sample data, determine gradient information corresponding to the trained graphical model based on the function value of the loss function corresponding to the graphical model, and send the gradient information to the server such that the server updates model parameters in the graphical model in the server based on gradient information provided by different terminal devices to obtain an updated graphical model.

During implementation, the above-mentioned two parts of losses can be integrated using a predetermined integration rule based on the function value of the predetermined first classification loss function corresponding to the first sample data and the function value of the predetermined second classification loss function corresponding to the second sample data, and the function value of the loss function corresponding to the graphical model is finally obtained. Then, corresponding gradient information can be calculated using a back propagation algorithm based on the function value of the loss function corresponding to the graphical model, so as to obtain the gradient information corresponding to the trained graphical model.

It is worthwhile to note that a fully connected network does not need to be deployed during deployment of inference, and only a graph neural network (GNN) needs to be deployed to perform general inference.

According to the privacy-preserving graphical model training method provided in some embodiments of this specification, the first graph is constructed using the predetermined fully connected network based on the node information of the first graph, and the second graph is constructed using the predetermined graph network based on the node information and the node connection information of the second graph, where the fully connected network and the graph network have the same network parameters; then, the first sample data are constructed using the predetermined InstaHide privacy protection rule based on the latent vector of the first node that has training label information in the first graph and the training label information corresponding to the first node, corresponding training label information is respectively generated for the second node that does not have training label information in the first graph and the node in the second graph, and the second sample data are constructed using the predetermined InstaHide privacy protection rule based on the latent vectors of the second node and the node in the second graph and the generated training label information; and finally, model training can be performed, based on the first sample data and the second sample data, on the graphical model sent by the server, gradient information corresponding to the trained graphical model is acquired, and the gradient information is sent to the server such that the server updates the model parameters in the graphical model in the server based on the gradient information provided by different terminal devices to obtain the updated graphical model. As such, based on the InstaHide privacy protection rule, a reasonable privacy protection level can be provided and model precision is relatively high, thereby drastically increasing difficulty in decoding user privacy data from the gradient information.

In addition, in some embodiments of this specification, a graph learning framework under a federated learning protocol is designed, and a privacy protection feature is implemented. Some embodiments of this specification not only provide a reasonable privacy protection level, but also avoid a model precision loss caused by a factor such as excessive noise, and therefore have better applicability.

Embodiment 3

Figure 4A:
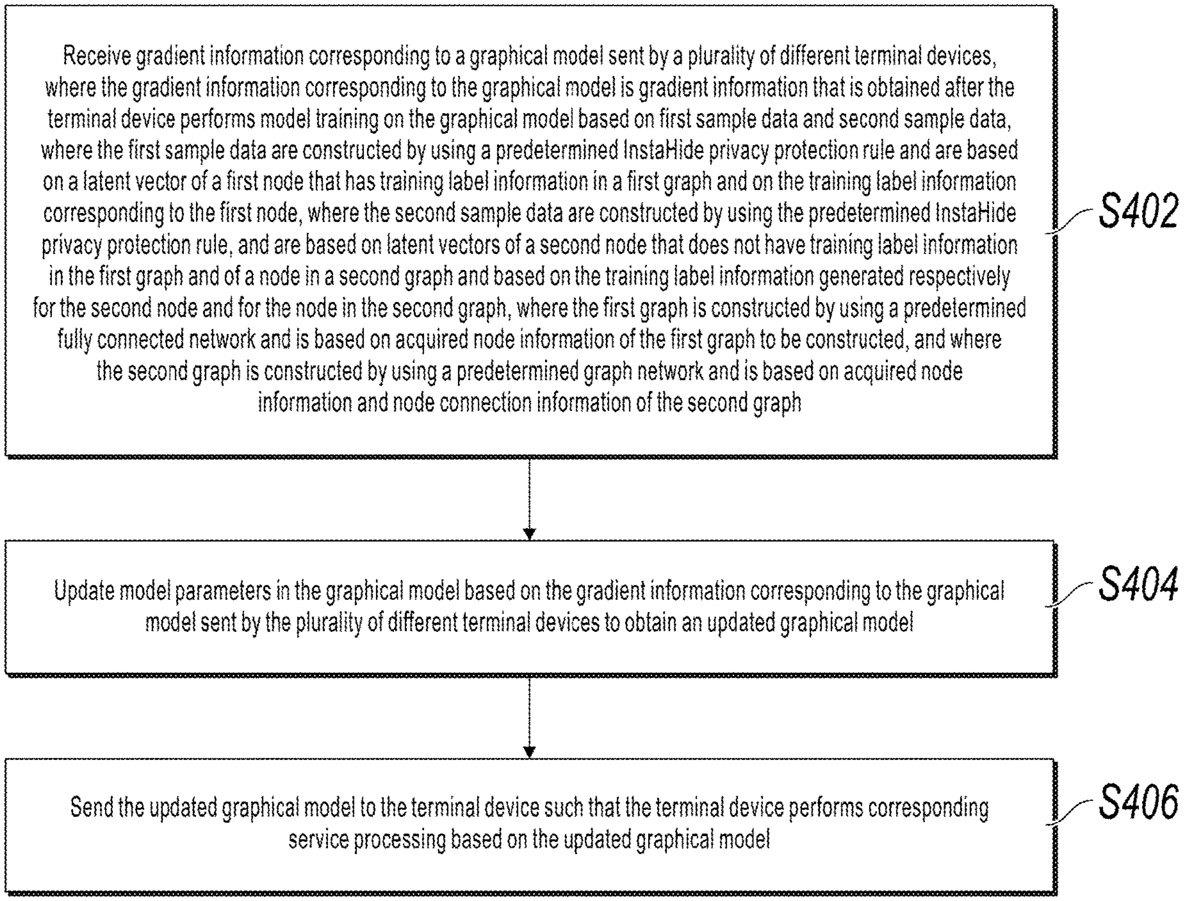
FIG. 4A shows some embodiments of another privacy-preserving graphical model training method, according to this specification.
Figure 4B:
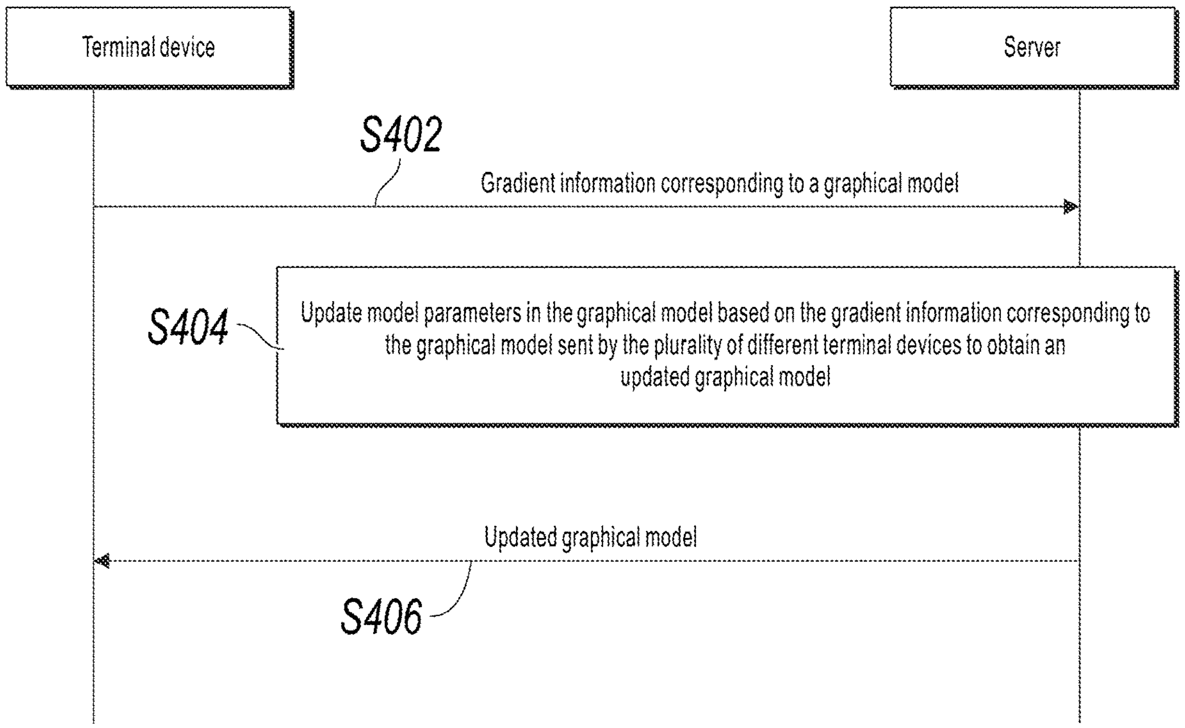
FIG. 4B is a schematic diagram illustrating still another processing procedure of privacy-preserving graphical model training, according to this specification.

As shown in FIG. 4A and FIG. 4B, some embodiments of this specification provide a privacy-preserving graphical model training method. The method can be performed by a server. The server can be a server of a specific service (such as a transaction service or a financial service). Specifically, for example, the server can be a server of a payment service, or can be a server of a service related to finance or instant messaging, or can be a server that needs to perform risk detection or privacy-preserving graphical model training on service data. The method can specifically include the following steps: Step S402: Receive gradient information corresponding to a graphical model sent by a plurality of different terminal devices, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph.

The graphical model can be constructed based on the graph neural network (GNN).

Step S404: Update model parameters in the graphical model based on the gradient information corresponding to the graphical model sent by the plurality of different terminal devices to obtain an updated graphical model.

The above-mentioned specific processing in step S404 can include a plurality of types. For example, integrated processing can be performed on the gradient information corresponding to the graphical model sent by the plurality of different terminal devices, to obtain integrated gradient information. Then, values of model parameters can be calculated based on the integrated gradient information and the graphical model, and then the model parameters in the graphical model can be updated using the calculated values of the model parameters to obtain the updated graphical model.

In practice, in addition to being implemented using the above-mentioned method, the above-mentioned specific processing in step S404 can also be implemented using a plurality of different methods. The following further provides an optional processing method, which can specifically include the following content: updating the model parameters in the graphical model by using a predetermined gradient update policy based on the gradient information corresponding to the graphical model sent by the plurality of different terminal devices to obtain the updated graphical model, where the predetermined gradient update policy includes one or more of a FedAvg gradient update policy and a FedSgd gradient update policy.

The FedAvg gradient update policy can be a policy for updating a gradient based on a federated averaging method, and the FedSgd gradient update policy can be a policy for updating a gradient based on a local stochastic gradient descent (SGD) averaging method.

Step S406: Send the updated graphical model to the terminal device such that the terminal device performs corresponding service processing based on the updated graphical model.

According to the privacy-preserving graphical model training method provided in some embodiments of this specification, the first graph is constructed using the predetermined fully connected network based on the node information of the first graph, and the second graph is constructed using the predetermined graph network based on the node information and the node connection information of the second graph, where the fully connected network and the graph network have the same network parameters; then, the first sample data are constructed using the predetermined InstaHide privacy protection rule based on the latent vector of the first node that has training label information in the first graph and the training label information corresponding to the first node, corresponding training label information is respectively generated for the second node that does not have training label information in the first graph and the node in the second graph, and the second sample data are constructed using the predetermined InstaHide privacy protection rule based on the latent vectors of the second node and the node in the second graph and the generated training label information; and finally, model training can be performed, based on the first sample data and the second sample data, on the graphical model sent by the server, gradient information corresponding to the trained graphical model is acquired, and the gradient information is sent to the server such that the server updates the model parameters in the graphical model in the server based on the gradient information provided by different terminal devices to obtain the updated graphical model. As such, based on the InstaHide privacy protection rule, a reasonable privacy protection level can be provided and model precision is relatively high, thereby drastically increasing difficulty in decoding user privacy data from the gradient information.

Embodiment 4

Figure 5A:
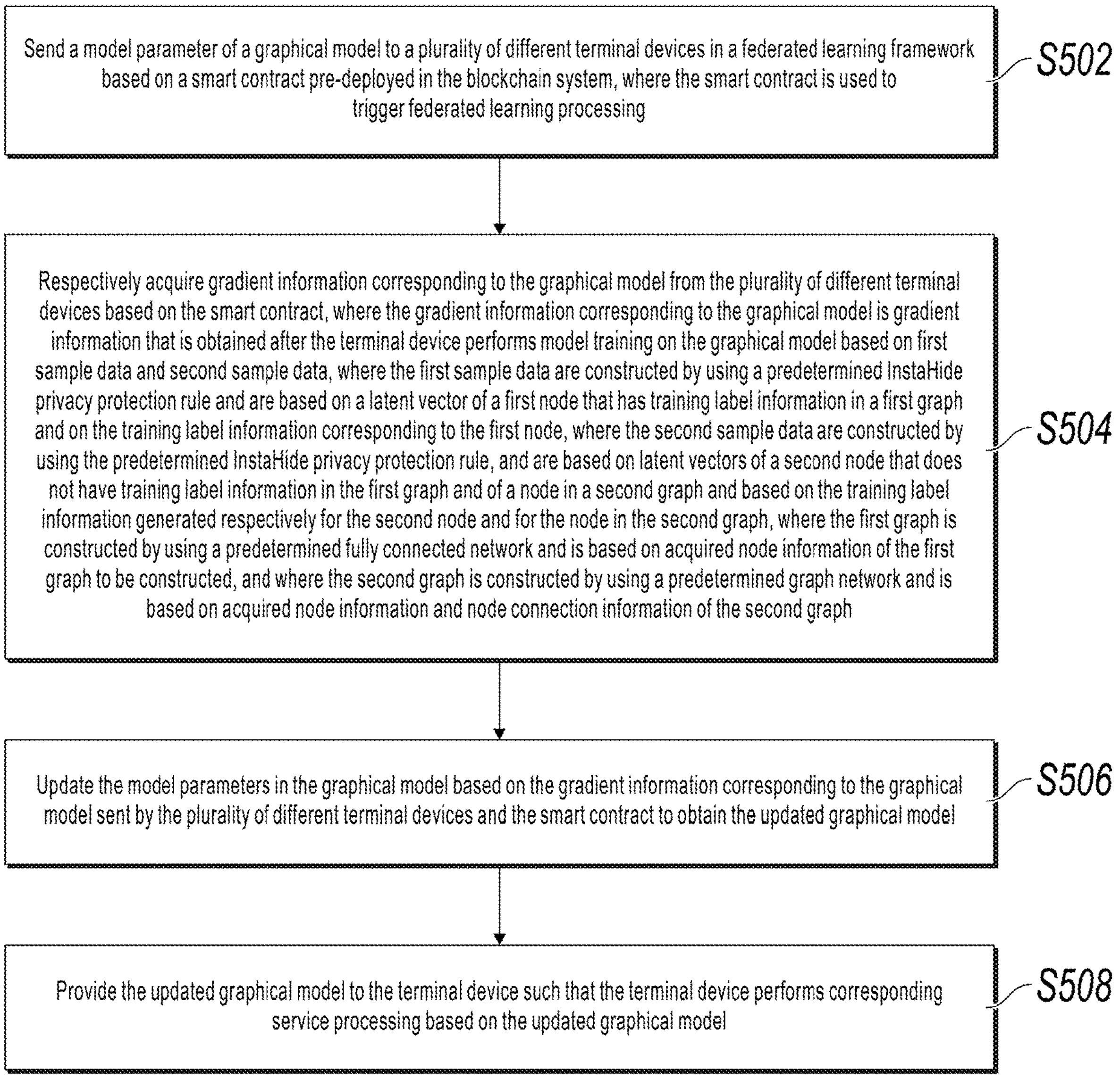
FIG. 5A shows some embodiments of still another privacy-preserving graphical model training method, according to this specification.
Figure 5B:
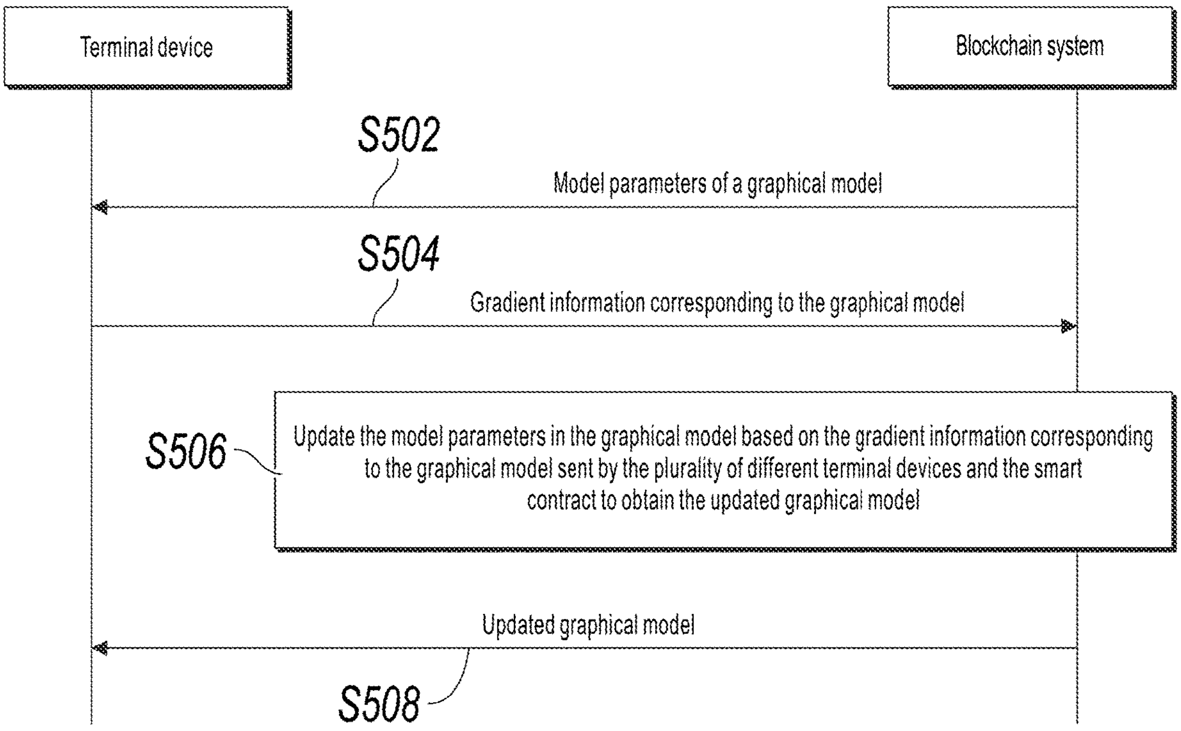
FIG. 5B is a schematic diagram illustrating still another processing procedure of privacy-preserving graphical model training, according to this specification.

As shown in FIG. 5A and FIG. 5B, some embodiments of this specification provide a privacy-preserving graphical model training method. The method can be performed by a blockchain system, and the blockchain system can include a terminal device, a server, etc. The terminal device can be a mobile terminal device such as a mobile phone or a tablet computer, or can be a device such as a personal computer. The server can be a standalone server, or can be a server cluster that includes a plurality of servers. The method can specifically include the following steps: Step S502: Send a model parameter of a graphical model to a plurality of different terminal devices in a federated learning framework based on a smart contract pre-deployed in the blockchain system, where the smart contract is used to trigger federated learning processing.

A rule used to trigger federated learning processing is set in the smart contract, and there can be one or more rules.

During implementation, a smart contract can be constructed in advance based on a processing procedure of the federated learning framework, and the constructed smart contract can be deployed in the blockchain system such that the federated learning processing is triggered using the smart contract. When federated learning needs to be performed, a smart contract can be invoked, and a processing procedure of executing federated learning is triggered using a corresponding rule that is set in the smart contract.

It is worthwhile to note that, in practice, the graphical model can be stored in the blockchain system, or can be stored in another storage device. For a case in which the graphical model is stored in another storage device, considering that the graphical model may need to be updated periodically or aperiodically. Since the blockchain system features tamper proof, if the graphical model is stored in the blockchain system, operations such as uploading, deletion, and uploader identity authentication need to be frequently performed on the graphical model in the blockchain system subsequently, increasing a processing pressure of the blockchain system. To improve processing efficiency and reduce the processing pressure of the blockchain system, the graphical model can be pre-stored in a designated storage address of the storage device, and the storage address (namely, index information) is uploaded to the blockchain system. Since the storage address can remain unchanged and is stored in the blockchain system, tamper proof of data in the blockchain system is ensured and the graphical model can be updated periodically or aperiodically in the above-mentioned storage device.

Based on the above-mentioned content, the processing in step S502 can further include: acquiring a model parameter of the graphical model in the federated learning framework based on the smart contract pre-deployed in the blockchain system, and sending the model parameter to a plurality of different terminal devices in the federated learning framework based on the smart contract.

Step S504: Respectively acquire gradient information corresponding to the graphical model from the plurality of different terminal devices based on the smart contract, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph.

Step S506: Update the model parameters in the graphical model based on the gradient information corresponding to the graphical model sent by the plurality of different terminal devices and the smart contract to obtain the updated graphical model.

Based on the above-mentioned content, the processing in step S506 can alternatively be performed using the following method: A2: Acquire index information of the graphical model from the blockchain system based on the smart contract, and acquire the graphical model based on the index information.

The index information can be used to record information such as a storage location of the graphical model. A corresponding graphical model can be quickly identified using the index information. After data corresponding to the index information are stored in the blockchain system, content of the index information is usually not modified, that is, the storage location of the graphical model corresponding to the index information usually does not change, thereby preventing the index information from being maliciously tampered with.

During implementation, to ensure integrity and tamper proof of the index information of the graphical model, the index information of the graphical model can be uploaded to the blockchain system. Specifically, to record the graphical model, the index information of the graphical model can be set in advance based on an actual situation, for example, an area in which the graphical model can be stored can be set in advance, and then the index information is generated based on the set area, and so on. After the index information is set, the index information can be uploaded to the blockchain system.

A4: Update the model parameters in the graphical model based on the gradient information corresponding to the graphical model sent by the plurality of different terminal devices and the smart contract to obtain the updated graphical model.

After the processing in step S506 is completed, the blockchain system can further perform the following processing: storing the updated graphical model in a storage area corresponding to the index information based on the index information and the smart contract.

In addition, based on the above-mentioned content, the processing in step S506 can alternatively be performed using the following method: B2: Acquire index information of the graphical model from the blockchain system based on the smart contract.

B4: Trigger a storage component corresponding to the index information based on the smart contract to update the model parameters in the graphical model based on the gradient information corresponding to the graphical model sent by the plurality of different terminal devices to obtain the updated graphical model.

In addition, the processing in step S506 can alternatively be performed using the following method: C2: Acquire, based on the above-mentioned smart contract, a gradient update policy for updating model parameters in the graphical model, where the gradient update policy includes one or more of a FedAvg gradient update policy and a FedSgd gradient update policy.

C4: Update model parameters in the graphical model by using the above-mentioned gradient update policy based on the gradient information corresponding to the graphical model sent by the plurality of different terminal devices to obtain an updated graphical model.

Step S508: Provide the updated graphical model to the terminal device such that the terminal device performs corresponding service processing based on the updated graphical model.

Based on the above-mentioned processing methods in B2 and B4, the processing in step S508 can alternatively be implemented using the following method: triggering the storage component corresponding to the index information based on the smart contract to provide the updated graphical model to the terminal device.

According to the privacy-preserving graphical model training method provided in some embodiments of this specification, the model parameter of the graphical model is sent to the plurality of different terminal devices in the federated learning framework based on the smart contract pre-deployed in the blockchain system; gradient information corresponding to the graphical model is respectively acquired from the plurality of different terminal devices based on the smart contract, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; the model parameters in the graphical model are updated based on the gradient information corresponding to the graphical model sent by the plurality of different terminal devices and the smart contract to obtain the updated graphical model. As such, based on the InstaHide privacy protection rule, a reasonable privacy protection level can be provided and model precision is relatively high, thereby drastically increasing difficulty in decoding user privacy data from the gradient information.

Embodiment 5

Figure 6:
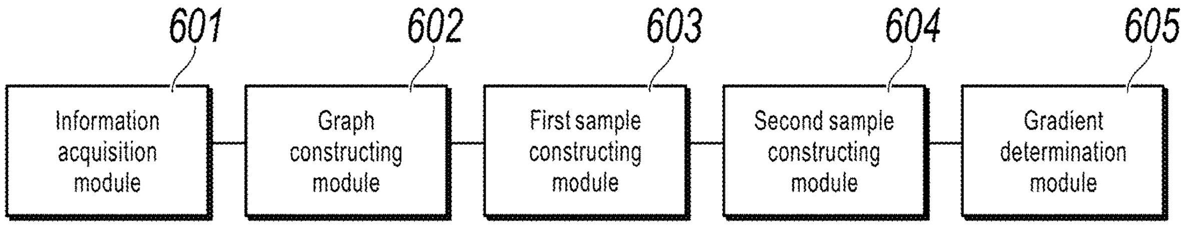
FIG. 6 shows some embodiments of a privacy-preserving graphical model training apparatus, according to this specification.

The privacy-preserving graphical model training method provided in some embodiments of this specification has been described above. Based on the same idea, some embodiments of this specification further provide a privacy-preserving graphical model training apparatus, as shown in FIG. 6.

The privacy-preserving graphical model training apparatus includes an information acquisition module 601, a graph constructing module 602, a first sample constructing module 603, a second sample constructing module 604, and a gradient determination module 605. The information acquisition module 601 is configured to acquire node information of a to-be-constructed first graph, and node information and node connection information of a second graph. The graph constructing module 602 is configured to construct the first graph by using a predetermined fully connected network based on the node information of the first graph, and construct the second graph by using a predetermined graph network based on the node information and the node connection information of the second graph, where the fully connected network and the graph network have same network parameters. The first sample constructing module 603 is configured to acquire a latent vector of a first node that has training label information in the first graph, and construct first sample data by using a predetermined InstaHide privacy protection rule based on the latent vector of the first node and the training label information corresponding to the first node. The second sample constructing module 604 is configured to respectively generate corresponding training label information for a second node that does not have training label information in the first graph and a node in the second graph, acquire latent vectors of the second node and the node in the second graph, and construct second sample data by using the predetermined InstaHide privacy protection rule based on the latent vectors of the second node and the node in the second graph and the generated training label information. The gradient determination module 605 is configured to perform, based on the first sample data and the second sample data, model training on a graphical model sent by a server, acquire gradient information corresponding to the trained graphical model, and send the gradient information to the server such that the server updates model parameters in the graphical model in the server based on gradient information provided by different terminal devices to obtain an updated graphical model.

In some embodiments of this specification, the fully connected network is a fully convolutional network (FCN), and the graph network is constructed based on a graph convolutional neural network (GCN), a graph attention network (GAT), or a GraphSAGE.

In some embodiments of this specification, the first sample constructing module 603 includes: an auxiliary parameter generating unit, configured to generate a permutation function and a weight that correspond to the first node based on the latent vector of the first node and the training label information corresponding to the first node; a pre-selected sample generating unit, configured to generate first pre-selected sample data based on the permutation function and the weight that correspond to the first node and the latent vector of the first node and the training label information corresponding to the first node; and a first sample constructing unit, configured to generate a node parameter corresponding to the first node, and generate the first sample data based on the node parameter corresponding to the first node and the first pre-selected sample data.

In some embodiments of this specification, a sum of weights corresponding to the first node is 1.

In some embodiments of this specification, the gradient determination module 605 includes: a first loss unit, configured to perform model training on the graphical model based on the first sample data to obtain a function value of a predetermined first classification loss function corresponding to the first sample data; a second loss unit, configured to perform model training on the graphical model based on the second sample data to obtain a function value of a predetermined second classification loss function corresponding to the second sample data; and a gradient determination unit, configured to determine a function value of a loss function corresponding to the graphical model based on the function value of the predetermined first classification loss function corresponding to the first sample data and the function value of the predetermined second classification loss function corresponding to the second sample data, determine gradient information corresponding to the trained graphical model based on the function value of the loss function corresponding to the graphical model, and send the gradient information to the server.

In some embodiments of this specification, the first classification loss function is the same as the second classification loss function, and the first classification loss function is a cross-entropy loss function.

In some embodiments of this specification, the second sample constructing module 604 is configured to respectively input node data of the second node that does not have training label information in the first graph and node data of the node in the second graph into a predetermined target graph neural network (GNN) model, to obtain training label information corresponding to the second node that does not have training label information in the first graph and the node in the second graph, where the target GNN model is obtained by performing supervised training based on a predetermined graph sample.

In some embodiments of this specification, the graphical model is constructed based on the graph neural network (GNN).

According to the privacy-preserving graphical model training apparatus provided in some embodiments of this specification, the first graph is constructed using the predetermined fully connected network based on the node information of the first graph, and the second graph is constructed using the predetermined graph network based on the node information and the node connection information of the second graph, where the fully connected network and the graph network have the same network parameters; then, the first sample data are constructed using the predetermined InstaHide privacy protection rule based on the latent vector of the first node that has training label information in the first graph and the training label information corresponding to the first node, corresponding training label information is respectively generated for the second node that does not have training label information in the first graph and the node in the second graph, and the second sample data are constructed using the predetermined InstaHide privacy protection rule based on the latent vectors of the second node and the node in the second graph and the generated training label information; and finally, model training can be performed, based on the first sample data and the second sample data, on the graphical model sent by the server, gradient information corresponding to the trained graphical model is acquired, and the gradient information is sent to the server such that the server updates the model parameters in the graphical model in the server based on the gradient information provided by different terminal devices to obtain the updated graphical model. As such, based on the InstaHide privacy protection rule, a reasonable privacy protection level can be provided and model precision is relatively high, thereby drastically increasing difficulty in decoding user privacy data from the gradient information.

In addition, in some embodiments of this specification, a graph learning framework under a federated learning protocol is designed, and a privacy protection feature is implemented. Some embodiments of this specification not only provide a reasonable privacy protection level, but also avoid a model precision loss caused by a factor such as excessive noise, and therefore have better applicability.

Embodiment 6

Figure 7:
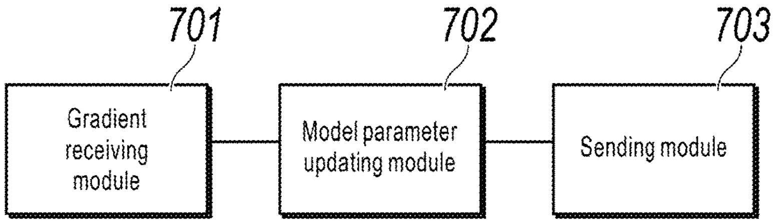
FIG. 7 shows some embodiments of another privacy-preserving graphical model training apparatus, according to this specification.

Based on the same idea, some embodiments of this specification further provide a privacy-preserving graphical model training apparatus, as shown in FIG. 7.

The privacy-preserving graphical model training apparatus includes a gradient receiving module 701, a model parameter updating module 702, and a sending module 703. The gradient receiving module 701 is configured to receive gradient information corresponding to a graphical model sent by a plurality of different terminal devices, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph. The model parameter updating module 702 is configured to update model parameters in the graphical model based on the gradient information corresponding to the graphical model sent by the plurality of different terminal devices to obtain an updated graphical model. The sending module 703 is configured to send the updated graphical model to the terminal device such that the terminal device performs corresponding service processing based on the updated graphical model.

In some embodiments of this specification, the model parameter updating module 702 is configured to update the model parameters in the graphical model by using a predetermined gradient update policy based on the gradient information corresponding to the graphical model sent by the plurality of different terminal devices to obtain the updated graphical model, where the predetermined gradient update policy includes one or more of a FedAvg gradient update policy and a FedSgd gradient update policy.

According to the privacy-preserving graphical model training apparatus provided in some embodiments of this specification, the first graph is constructed using the predetermined fully connected network based on the node information of the first graph, and the second graph is constructed using the predetermined graph network based on the node information and the node connection information of the second graph, where the fully connected network and the graph network have the same network parameters; then, the first sample data are constructed using the predetermined InstaHide privacy protection rule based on the latent vector of the first node that has training label information in the first graph and the training label information corresponding to the first node, corresponding training label information is respectively generated for the second node that does not have training label information in the first graph and the node in the second graph, and the second sample data are constructed using the predetermined InstaHide privacy protection rule based on the latent vectors of the second node and the node in the second graph and the generated training label information; and finally, model training can be performed, based on the first sample data and the second sample data, on the graphical model sent by the server, gradient information corresponding to the trained graphical model is acquired, and the gradient information is sent to the server such that the server updates the model parameters in the graphical model in the server based on the gradient information provided by different terminal devices to obtain the updated graphical model. As such, based on the InstaHide privacy protection rule, a reasonable privacy protection level can be provided and model precision is relatively high, thereby drastically increasing difficulty in decoding user privacy data from the gradient information.

Embodiment 7

Figure 8:
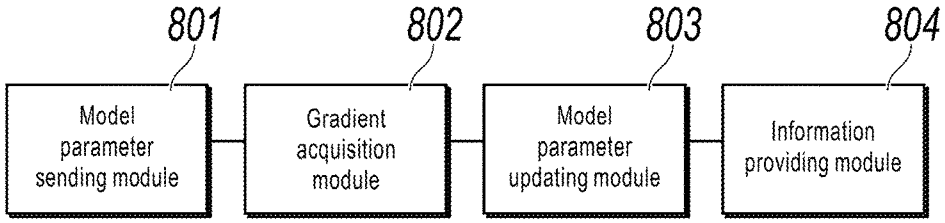
FIG. 8 shows some embodiments of still another privacy-preserving graphical model training apparatus, according to this specification.

Based on the same idea, some embodiments of this specification further provide a privacy-preserving graphical model training apparatus, where the apparatus is an apparatus in a blockchain system, as shown in FIG. 8.

The privacy-preserving graphical model training apparatus includes a model parameter sending module 801, a gradient acquisition module 802, a model parameter updating module 803, and an information providing module 804. The model parameter sending module 801 is configured to send a model parameter of a graphical model to a plurality of different terminal devices in a federated learning framework based on a smart contract pre-deployed in the blockchain system, where the smart contract is used to trigger federated learning processing. The gradient acquisition module 802 is configured to respectively acquire gradient information corresponding to the graphical model from the plurality of different terminal devices based on the smart contract, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph. The model parameter updating module 803 is configured to update the model parameters in the graphical model based on the gradient information corresponding to the graphical model sent by the plurality of different terminal devices and the smart contract to obtain the updated graphical model. The information providing module 804 is configured to provide the updated graphical model to the terminal device such that the terminal device performs corresponding service processing based on the updated graphical model.

In some embodiments of this specification, the model parameter updating module 803 includes: a first information acquisition unit, configured to acquire index information of the graphical model from the blockchain system based on the smart contract, and acquire the graphical model based on the index information; and a first model parameter updating unit, configured to update the model parameters in the graphical model based on the gradient information corresponding to the graphical model sent by the plurality of different terminal devices and the smart contract to obtain the updated graphical model. The apparatus further includes a storage triggering module, configured to store the updated graphical model in a storage area corresponding to the index information based on the index information and the smart contract.

In some embodiments of this specification, the model parameter updating module 803 includes: a second information acquisition unit, configured to acquire index information of the graphical model from the blockchain system based on the smart contract; a second model parameter updating unit, configured to trigger a storage component corresponding to the index information based on the smart contract to update the model parameters in the graphical model based on the gradient information corresponding to the graphical model sent by the plurality of different terminal devices to obtain the updated graphical model; and the information providing module, configured to trigger the storage component corresponding to the index information based on the smart contract to provide the updated graphical model to the terminal device.

According to the privacy-preserving graphical model training apparatus provided in some embodiments of this specification, the model parameter of the graphical model is sent to the plurality of different terminal devices in the federated learning framework based on the smart contract pre-deployed in the blockchain system; gradient information corresponding to the graphical model is respectively acquired from the plurality of different terminal devices based on the smart contract, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; the model parameters in the graphical model are updated based on the gradient information corresponding to the graphical model sent by the plurality of different terminal devices and the smart contract to obtain the updated graphical model. As such, based on the InstaHide privacy protection rule, a reasonable privacy protection level can be provided and model precision is relatively high, thereby drastically increasing difficulty in decoding user privacy data from the gradient information.

Embodiment 8

Figure 9:
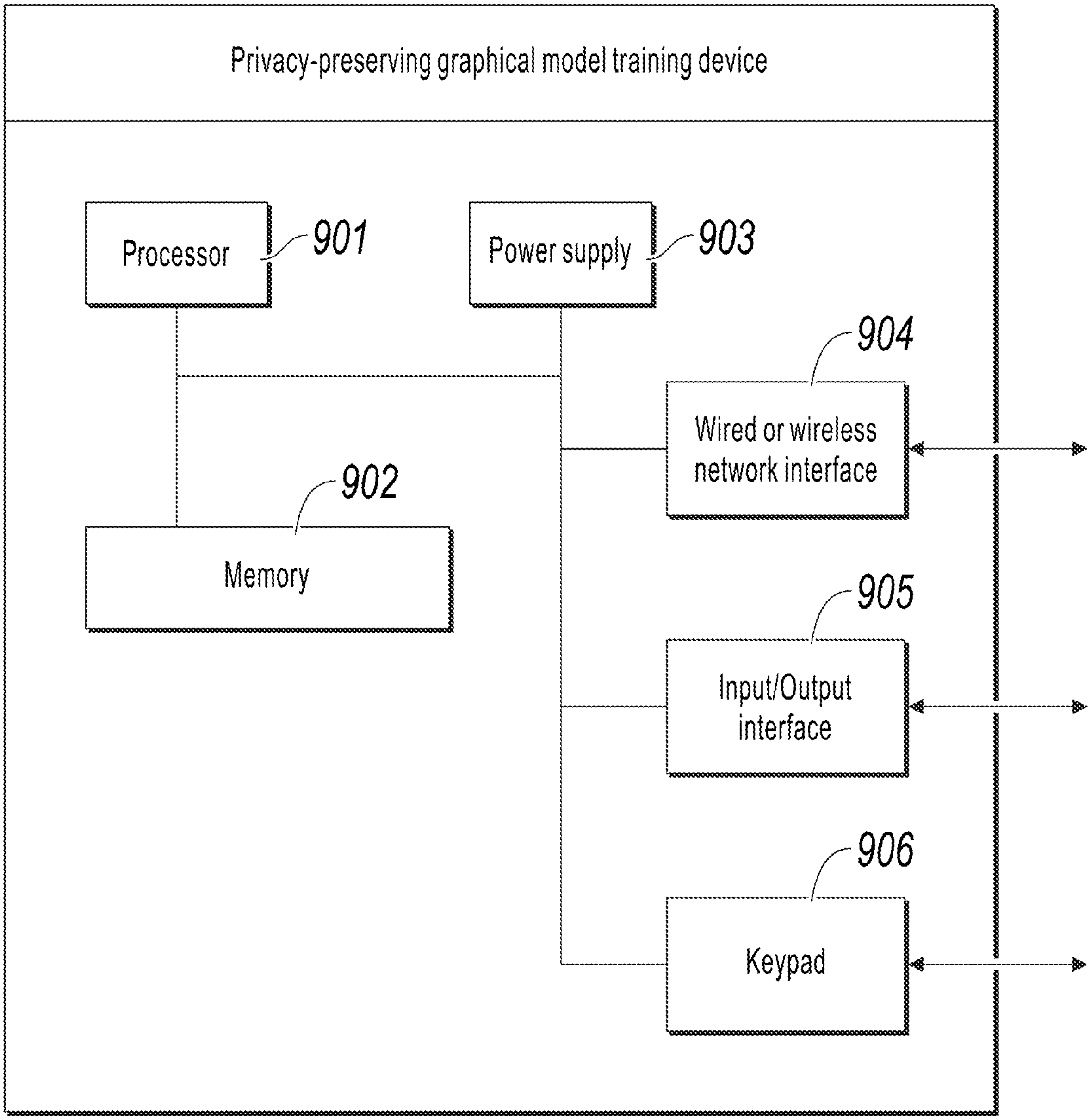
FIG. 9 shows some embodiments of a privacy-preserving graphical model training device, according to this specification.

The privacy-preserving graphical model training apparatus provided in some embodiments of this specification has been described above. Based on the same idea, some embodiments of this specification further provide a privacy-preserving graphical model training device, as shown in FIG. 9.

The privacy-preserving graphical model training device can be a server, a terminal device, a device in a blockchain system, or the like provided in some embodiments described above.

The privacy-preserving graphical model training device can differ greatly because of a difference in configuration or performance, and can include one or more processors 901 and one or more memories 902. The memory 902 can store one or more application programs or data. The memory 902 can be a temporary storage or a persistent storage. The application program stored in the memory 902 can include one or more modules (not shown in the figure), and each module can include a series of computer-executable instructions in the privacy-preserving graphical model training device. Still further, the processor 901 can be configured to communicate with the memory 902 to execute a series of computer-executable instructions in the memory 902 on the privacy-preserving graphical model training device. The privacy-preserving graphical model training device can further include one or more power supplies 903, one or more wired or wireless network interfaces 904, one or more input/output interfaces 905, one or more keypads 906, etc.

Specifically, in these embodiments, the privacy-preserving graphical model training device includes a memory and one or more programs. The one or more programs are stored in the memory, and the one or more programs can include one or more modules, and each module can include a series of computer-executable instructions in the privacy-preserving graphical model training device. One or more processors are configured to execute the computer-executable instructions included in the one or more programs to perform the following operations: acquiring node information of a to-be-constructed first graph, and node information and node connection information of a second graph; constructing the first graph by using a predetermined fully connected network based on the node information of the first graph, and constructing the second graph by using a predetermined graph network based on the node information and the node connection information of the second graph, where the fully connected network and the graph network have same network parameters; acquiring a latent vector of a first node that has training label information in the first graph, and constructing first sample data by using a predetermined InstaHide privacy protection rule based on the latent vector of the first node and the training label information corresponding to the first node; respectively generating corresponding training label information for a second node that does not have training label information in the first graph and a node in the second graph, acquiring latent vectors of the second node and the node in the second graph, and constructing second sample data by using the predetermined InstaHide privacy protection rule based on the latent vectors of the second node and the node in the second graph and the generated training label information; and performing, based on the first sample data and the second sample data, model training on a graphical model sent by a server, acquiring gradient information corresponding to the trained graphical model, and sending the gradient information to the server such that the server updates model parameters in the graphical model in the server based on gradient information provided by different terminal devices to obtain an updated graphical model.

In some embodiments of this specification, the fully connected network is a fully convolutional network (FCN), and the graph network is constructed based on a graph convolutional neural network (GCN), a graph attention network (GAT), or a GraphSAGE.

In some embodiments of this specification, the constructing first sample data by using a predetermined InstaHide privacy protection rule based on the latent vector of the first node and the training label information corresponding to the first node includes: generating a permutation function and a weight that correspond to the first node based on the latent vector of the first node and the training label information corresponding to the first node; generating first pre-selected sample data based on the permutation function and the weight that correspond to the first node and the latent vector of the first node and the training label information corresponding to the first node; and generating a node parameter corresponding to the first node, and generating the first sample data based on the node parameter corresponding to the first node and the first pre-selected sample data.

In some embodiments of this specification, a sum of weights corresponding to the first node is 1.

In some embodiments of this specification, the performing, based on the first sample data and the second sample data, model training on a graphical model, acquiring gradient information corresponding to the trained graphical model, and sending the gradient information to the server includes: performing model training on the graphical model based on the first sample data to obtain a function value of a predetermined first classification loss function corresponding to the first sample data; performing model training on the graphical model based on the second sample data to obtain a function value of a predetermined second classification loss function corresponding to the second sample data; and determining a function value of a loss function corresponding to the graphical model based on the function value of the predetermined first classification loss function corresponding to the first sample data and the function value of the predetermined second classification loss function corresponding to the second sample data, determining gradient information corresponding to the trained graphical model based on the function value of the loss function corresponding to the graphical model, and sending the gradient information to the server.

In some embodiments of this specification, the first classification loss function is the same as the second classification loss function, and the first classification loss function is a cross-entropy loss function.

In some embodiments of this specification, the respectively generating corresponding training label information for a second node that does not have training label information in the first graph and a node in the second graph includes: respectively inputting node data of the second node that does not have training label information in the first graph and node data of the node in the second graph into a predetermined target graph neural network (GNN) model, to obtain training label information corresponding to the second node that does not have training label information in the first graph and the node in the second graph, where the target GNN model is obtained by performing supervised training based on a predetermined graph sample.

In some embodiments of this specification, the graphical model is constructed based on the graph neural network (GNN).

In addition, specifically, in these embodiments, the privacy-preserving graphical model training device includes a memory and one or more programs. The one or more programs are stored in the memory, and the one or more programs can include one or more modules, and each module can include a series of computer-executable instructions in the privacy-preserving graphical model training device. One or more processors are configured to execute the computer-executable instructions included in the one or more programs to perform the following operations: receiving gradient information corresponding to a graphical model sent by a plurality of different terminal devices, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; updating model parameters in the graphical model based on the gradient information corresponding to the graphical model sent by the plurality of different terminal devices to obtain an updated graphical model; and sending the updated graphical model to the terminal device such that the terminal device performs corresponding service processing based on the updated graphical model.

In some embodiments of this specification, the updating model parameters in the graphical model based on the gradient information corresponding to the graphical model sent by the plurality of different terminal devices to obtain an updated graphical model includes: updating the model parameters in the graphical model by using a predetermined gradient update policy based on the gradient information corresponding to the graphical model sent by the plurality of different terminal devices to obtain the updated graphical model, where the predetermined gradient update policy includes one or more of a FedAvg gradient update policy and a FedSgd gradient update policy.

In addition, specifically, in these embodiments, the privacy-preserving graphical model training device includes a memory and one or more programs. The one or more programs are stored in the memory, and the one or more programs can include one or more modules, and each module can include a series of computer-executable instructions in the privacy-preserving graphical model training device. One or more processors are configured to execute the computer-executable instructions included in the one or more programs to perform the following operations: sending a model parameter of a graphical model to a plurality of different terminal devices in a federated learning framework based on a smart contract pre-deployed in the blockchain system, where the smart contract is used to trigger federated learning processing; respectively acquiring gradient information corresponding to the graphical model from the plurality of different terminal devices based on the smart contract, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; updating the model parameters in the graphical model based on the gradient information corresponding to the graphical model sent by the plurality of different terminal devices and the smart contract to obtain the updated graphical model; and providing the updated graphical model to the terminal device such that the terminal device performs corresponding service processing based on the updated graphical model.

In some embodiments of this specification, the updating model parameters in the graphical model based on the gradient information corresponding to the graphical model sent by the plurality of different terminal devices and the smart contract to obtain an updated graphical model includes: acquiring index information of the graphical model from the blockchain system based on the smart contract, and acquiring the graphical model based on the index information; and updating the model parameters in the graphical model based on the gradient information corresponding to the graphical model sent by the plurality of different terminal devices and the smart contract to obtain the updated graphical model; and the method further includes: storing the updated graphical model in a storage area corresponding to the index information based on the index information and the smart contract.

In some embodiments of this specification, the updating model parameters in the graphical model based on the gradient information corresponding to the graphical model sent by the plurality of different terminal devices and the smart contract to obtain an updated graphical model includes: acquiring index information of the graphical model from the blockchain system based on the smart contract; and triggering a storage component corresponding to the index information based on the smart contract to update the model parameters in the graphical model based on the gradient information corresponding to the graphical model sent by the plurality of different terminal devices to obtain the updated graphical model; and the providing the updated graphical model to the terminal device includes: triggering the storage component corresponding to the index information based on the smart contract to provide the updated graphical model to the terminal device.

According to the privacy-preserving graphical model training device provided in some embodiments of this specification, the first graph is constructed using the predetermined fully connected network based on the node information of the first graph, and the second graph is constructed using the predetermined graph network based on the node information and the node connection information of the second graph, where the fully connected network and the graph network have the same network parameters; then, the first sample data are constructed using the predetermined InstaHide privacy protection rule based on the latent vector of the first node that has training label information in the first graph and the training label information corresponding to the first node, corresponding training label information is respectively generated for the second node that does not have training label information in the first graph and the node in the second graph, and the second sample data are constructed using the predetermined InstaHide privacy protection rule based on the latent vectors of the second node and the node in the second graph and the generated training label information; and finally, model training can be performed, based on the first sample data and the second sample data, on the graphical model sent by the server, gradient information corresponding to the trained graphical model is acquired, and the gradient information is sent to the server such that the server updates the model parameters in the graphical model in the server based on the gradient information provided by different terminal devices to obtain the updated graphical model. As such, based on the InstaHide privacy protection rule, a reasonable privacy protection level can be provided and model precision is relatively high, thereby drastically increasing difficulty in decoding user privacy data from the gradient information.

In addition, in some embodiments of this specification, a graph learning framework under a federated learning protocol is designed, and a privacy protection feature is implemented. Some embodiments of this specification not only provide a reasonable privacy protection level, but also avoid a model precision loss caused by a factor such as excessive noise, and therefore have better applicability.

Embodiment 9

Further, based on the above-mentioned methods shown in FIG. 1A and FIG. 5B, one or more embodiments of this specification further provide a storage medium, configured to store computer-executable instruction information. In some specific embodiments, the storage medium can be a USB flash drive, an optical disc, a hard disk, etc., and the computer-executable instruction information stored in the storage medium can be executed by the processor to implement the following procedure: acquiring node information of a to-be-constructed first graph, and node information and node connection information of a second graph; constructing the first graph by using a predetermined fully connected network based on the node information of the first graph, and constructing the second graph by using a predetermined graph network based on the node information and the node connection information of the second graph, where the fully connected network and the graph network have same network parameters; acquiring a latent vector of a first node that has training label information in the first graph, and constructing first sample data by using a predetermined InstaHide privacy protection rule based on the latent vector of the first node and the training label information corresponding to the first node; respectively generating corresponding training label information for a second node that does not have training label information in the first graph and a node in the second graph, acquiring latent vectors of the second node and the node in the second graph, and constructing second sample data by using the predetermined InstaHide privacy protection rule based on the latent vectors of the second node and the node in the second graph and the generated training label information; and performing, based on the first sample data and the second sample data, model training on a graphical model sent by a server, acquiring gradient information corresponding to the trained graphical model, and sending the gradient information to the server such that the server updates model parameters in the graphical model in the server based on gradient information provided by different terminal devices to obtain an updated graphical model.

In some embodiments of this specification, the fully connected network is a fully convolutional network (FCN), and the graph network is constructed based on a graph convolutional neural network (GCN), a graph attention network (GAT), or a GraphSAGE.

In some embodiments of this specification, the constructing first sample data by using a predetermined InstaHide privacy protection rule based on the latent vector of the first node and the training label information corresponding to the first node includes: generating a permutation function and a weight that correspond to the first node based on the latent vector of the first node and the training label information corresponding to the first node; generating first pre-selected sample data based on the permutation function and the weight that correspond to the first node and the latent vector of the first node and the training label information corresponding to the first node; and generating a node parameter corresponding to the first node, and generating the first sample data based on the node parameter corresponding to the first node and the first pre-selected sample data.

In some embodiments of this specification, a sum of weights corresponding to the first node is 1.

In some embodiments of this specification, the performing, based on the first sample data and the second sample data, model training on a graphical model, acquiring gradient information corresponding to the trained graphical model, and sending the gradient information to the server includes: performing model training on the graphical model based on the first sample data to obtain a function value of a predetermined first classification loss function corresponding to the first sample data; performing model training on the graphical model based on the second sample data to obtain a function value of a predetermined second classification loss function corresponding to the second sample data; and determining a function value of a loss function corresponding to the graphical model based on the function value of the predetermined first classification loss function corresponding to the first sample data and the function value of the predetermined second classification loss function corresponding to the second sample data, determining gradient information corresponding to the trained graphical model based on the function value of the loss function corresponding to the graphical model, and sending the gradient information to the server.

In some embodiments of this specification, the first classification loss function is the same as the second classification loss function, and the first classification loss function is a cross-entropy loss function.

In some embodiments of this specification, the respectively generating corresponding training label information for a second node that does not have training label information in the first graph and a node in the second graph includes: respectively inputting node data of the second node that does not have training label information in the first graph and node data of the node in the second graph into a predetermined target graph neural network (GNN) model, to obtain training label information corresponding to the second node that does not have training label information in the first graph and the node in the second graph, where the target GNN model is obtained by performing supervised training based on a predetermined graph sample.

In some embodiments of this specification, the graphical model is constructed based on the graph neural network (GNN).

In some other specific embodiments, the storage medium can be a USB flash drive, an optical disc, a hard disk, etc., and the computer-executable instruction information stored in the storage medium can be executed by the processor to implement the following procedure: receiving gradient information corresponding to a graphical model sent by a plurality of different terminal devices, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; updating model parameters in the graphical model based on the gradient information corresponding to the graphical model sent by the plurality of different terminal devices to obtain an updated graphical model; and sending the updated graphical model to the terminal device such that the terminal device performs corresponding service processing based on the updated graphical model.

In some embodiments of this specification, the updating model parameters in the graphical model based on the gradient information corresponding to the graphical model sent by the plurality of different terminal devices to obtain an updated graphical model includes: updating the model parameters in the graphical model by using a predetermined gradient update policy based on the gradient information corresponding to the graphical model sent by the plurality of different terminal devices to obtain the updated graphical model, where the predetermined gradient update policy includes one or more of a FedAvg gradient update policy and a FedSgd gradient update policy.

In some other specific embodiments, the storage medium can be a USB flash drive, an optical disc, a hard disk, etc., and the computer-executable instruction information stored in the storage medium can be executed by the processor to implement the following procedure: sending a model parameter of a graphical model to a plurality of different terminal devices in a federated learning framework based on a smart contract pre-deployed in the blockchain system, where the smart contract is used to trigger federated learning processing; respectively acquiring gradient information corresponding to the graphical model from the plurality of different terminal devices based on the smart contract, where the gradient information corresponding to the graphical model is gradient information that is obtained after the terminal device performs model training on the graphical model based on first sample data and second sample data, where the first sample data are constructed by using a predetermined InstaHide privacy protection rule and are based on a latent vector of a first node that has training label information in a first graph and on the training label information corresponding to the first node, where the second sample data are constructed by using the predetermined InstaHide privacy protection rule, and are based on latent vectors of a second node that does not have training label information in the first graph and of a node in a second graph and based on the training label information generated respectively for the second node and for the node in the second graph, where the first graph is constructed by using a predetermined fully connected network and is based on acquired node information of the first graph to be constructed, and where the second graph is constructed by using a predetermined graph network and is based on acquired node information and node connection information of the second graph; updating the model parameters in the graphical model based on the gradient information corresponding to the graphical model sent by the plurality of different terminal devices and the smart contract to obtain the updated graphical model; and providing the updated graphical model to the terminal device such that the terminal device performs corresponding service processing based on the updated graphical model.

In some embodiments of this specification, the updating model parameters in the graphical model based on the gradient information corresponding to the graphical model sent by the plurality of different terminal devices and the smart contract to obtain an updated graphical model includes: acquiring index information of the graphical model from the blockchain system based on the smart contract, and acquiring the graphical model based on the index information; and updating the model parameters in the graphical model based on the gradient information corresponding to the graphical model sent by the plurality of different terminal devices and the smart contract to obtain the updated graphical model; and the method further includes: storing the updated graphical model in a storage area corresponding to the index information based on the index information and the smart contract.

In some embodiments of this specification, the updating model parameters in the graphical model based on the gradient information corresponding to the graphical model sent by the plurality of different terminal devices and the smart contract to obtain an updated graphical model includes: acquiring index information of the graphical model from the blockchain system based on the smart contract; and triggering a storage component corresponding to the index information based on the smart contract to update the model parameters in the graphical model based on the gradient information corresponding to the graphical model sent by the plurality of different terminal devices to obtain the updated graphical model; and the providing the updated graphical model to the terminal device includes: triggering the storage component corresponding to the index information based on the smart contract to provide the updated graphical model to the terminal device.

According to the storage medium provided in some embodiments of this specification, the first graph is constructed using the predetermined fully connected network based on the node information of the first graph, and the second graph is constructed using the predetermined graph network based on the node information and the node connection information of the second graph, where the fully connected network and the graph network have the same network parameters; then, the first sample data are constructed using the predetermined InstaHide privacy protection rule based on the latent vector of the first node that has training label information in the first graph and the training label information corresponding to the first node, corresponding training label information is respectively generated for the second node that does not have training label information in the first graph and the node in the second graph, and the second sample data are constructed using the predetermined InstaHide privacy protection rule based on the latent vectors of the second node and the node in the second graph and the generated training label information; and finally, model training can be performed, based on the first sample data and the second sample data, on the graphical model sent by the server, gradient information corresponding to the trained graphical model is acquired, and the gradient information is sent to the server such that the server updates the model parameters in the graphical model in the server based on the gradient information provided by different terminal devices to obtain the updated graphical model. As such, based on the InstaHide privacy protection rule, a reasonable privacy protection level can be provided and model precision is relatively high, thereby drastically increasing difficulty in decoding user privacy data from the gradient information.

In addition, in some embodiments of this specification, a graph learning framework under a federated learning protocol is designed, and a privacy protection feature is implemented. Some embodiments of this specification not only provide a reasonable privacy protection level, but also avoid a model precision loss caused by a factor such as excessive noise, and therefore have better applicability.

Some specific embodiments of this specification are described above. Other embodiments fall within the scope of the appended claims. In some cases, actions or steps described in the claims can be performed in a sequence different from that in some embodiments and desired results can still be achieved. In addition, processes described in the accompanying drawings do not necessarily need a specific order or a sequential order shown to achieve the desired results. In some implementations, multi-tasking and parallel processing are also possible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed using the several described hardware description languages and is programmed into an integrated circuit.

A controller can be implemented using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Alternatively, the apparatus configured to implement various functions can even be considered as both a software module implementing the method and a structure in the hardware component.

The system, apparatus, module, or unit illustrated in the embodiments can be specifically implemented using a computer chip or an entity, or can be implemented using a product having a certain function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, during implementation of one or more embodiments of this specification, the functions of each unit can be implemented in one or more pieces of software and/or hardware.

A person skilled in the art should understand that some embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

Some embodiments of this specification are described with reference to flowcharts and/or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable fraudulent case serial-parallel device to generate a machine such that the instructions executed by the computer or the processor of the another programmable fraudulent case serial-parallel device generate an apparatus for implementing a specific function in one or more processes in the flowcharts and/or in one or more blocks in the block diagrams.

These computer program instructions can be stored in a computer-readable memory that can instruct the computer or the another programmable fraudulent case serial-parallel device to work in a specific way such that the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable fraudulent case serial-parallel device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPU), input/output interfaces, network interfaces, and memories.

The memory may include a non-persistent memory, a random access memory (RAM), and/or a non-volatile memory in a computer-readable medium, for example, a read-only memory (ROM) or a flash read-only memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information that can be accessed by a computing device. Based on the definition in this specification, the computer-readable medium does not include transitory media such as a modulated data signal and carrier.

It is worthwhile to further note that, the terms "include", "comprise", or any other variant thereof are intended to cover a non-exclusive inclusion such that a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

One or more embodiments of this specification can be described in the general context of computer-executable instructions, for example, a program module. Generally, the program module includes a routine, a program, an object, a component, a data structure, etc. executing a specific task or implementing a specific abstract data type. One or more embodiments of this specification can alternatively be practiced in distributed computing environments in which tasks are performed by remote processing devices that are connected through a communication network. In the distributed computing environments, the program module can be located in a local and remote computer storage medium including a storage device.

The embodiments in this specification are described in a progressive way. For same or similar parts of the embodiments, references can be made to the embodiments mutually. Each embodiment focuses on a difference from other embodiments. Particularly, a system embodiment is similar to a method embodiment, and therefore is described briefly. For related parts, references can be made to related descriptions in the method embodiment.

The above-mentioned descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

The invention claimed is:

1. A computer implemented method for graphical model training, comprising:

acquiring, by a terminal device, node information of a first graph to be constructed, node information of a second graph and node connection information of the second graph;

constructing, by the terminal device, the first graph by using a predetermined fully connected network based on the node information of the first graph;

constructing the second graph by using a predetermined graph network based on the node information and the node connection information of the second graph, wherein the predetermined fully connected network and the predetermined graph network have same network parameters;

acquiring, by the terminal device, a latent vector of a first node that has training label information in the first graph;

constructing, by the terminal device, first sample data by using a predetermined InstaHide privacy protection rule based on the latent vector of the first node and the training label information corresponding to the first node;

generating, by the terminal device, training label information for a second node without training label information in the first graph and a node in the second graph;

acquiring, by the terminal device, latent vectors of the second node and the node in the second graph;

constructing, by the terminal device, second sample data by using the predetermined InstaHide privacy protection rule based on the latent vectors of the second node, the node in the second graph, and the generated training label information; and performing, by the terminal device based on the first sample data and the second sample data, model training on a graphical model sent by a server;

acquiring, by the terminal device, gradient information corresponding to the trained graphical model; and sending, by the terminal device, the gradient information to the server for the server to update model parameters in the graphical model based on gradient information provided by different terminal devices to obtain an updated graphical model.

2. The method according to claim 1, wherein the predetermined fully connected network is a fully convolutional network (FCN), and the predetermined graph network is constructed based on a graph convolutional neural network (GCN), a graph attention network (GAT), or a GraphSAGE.

3. The method according to claim 1, wherein the constructing first sample data by using a predetermined InstaHide privacy protection rule comprises:

generating a permutation function and a weight that correspond to the first node based on the latent vector of the first node and the training label information corresponding to the first node;

generating first pre-selected sample data based on the permutation function and the weight that correspond to the first node, the latent vector of the first node, and the training label information corresponding to the first node;

generating a node parameter corresponding to the first node; and generating the first sample data based on the node parameter corresponding to the first node and the first pre-selected sample data.

4. The method according to claim 3, wherein a sum of weights corresponding to the first node is 1.

5. The method according to claim 1, wherein the performing, based on the first sample data and the second sample data, model training on a graphical model comprises:

performing model training on the graphical model based on the first sample data to obtain a function value of a predetermined first classification loss function corresponding to the first sample data; and performing model training on the graphical model based on the second sample data to obtain a function value of a predetermined second classification loss function corresponding to the second sample data; and wherein the acquiring gradient information corresponding to the trained graphical model comprises:

determining a function value of a loss function corresponding to the graphical model based on the function value of the predetermined first classification loss function corresponding to the first sample data and the function value of the predetermined second classification loss function corresponding to the second sample data; and determining gradient information corresponding to the trained graphical model based on the function value of the loss function corresponding to the graphical model.

6. The method according to claim 5, wherein the predetermined first classification loss function is same as the predetermined second classification loss function, and the predetermined first classification loss function is a cross-entropy loss function.

7. The method according to claim 1, wherein the generating training label information for a second node without training label information in the first graph and a node in the second graph comprises:

inputting node data of the second node without training label information in the first graph and node data of the node in the second graph into a predetermined target graph neural network (GNN) model, to obtain training label information corresponding to the second node without training label information in the first graph and the node in the second graph, wherein the predetermined target GNN model is obtained by performing supervised training based on a predetermined graph sample.

8. The method according to claim 1, wherein the graphical model is constructed based on a graph neural network (GNN).

9. A non-transitory, computer-readable medium storing one or more instructions executable by a computer system to perform operations comprising:

acquiring, by a terminal device, node information of a first graph to be constructed, node information of a second graph and node connection information of the second graph;

constructing, by the terminal device, the first graph by using a predetermined fully connected network based on the node information of the first graph;

constructing the second graph by using a predetermined graph network based on the node information and the node connection information of the second graph, wherein the predetermined fully connected network and the predetermined graph network have same network parameters;

acquiring, by the terminal device, a latent vector of a first node that has training label information in the first graph;

constructing, by the terminal device, first sample data by using a predetermined InstaHide privacy protection rule based on the latent vector of the first node and the training label information corresponding to the first node;

generating, by the terminal device, training label information for a second node without training label information in the first graph and a node in the second graph;

acquiring, by the terminal device, latent vectors of the second node and the node in the second graph;

constructing, by the terminal device, second sample data by using the predetermined InstaHide privacy protection rule based on the latent vectors of the second node, the node in the second graph, and the generated training label information; and performing, by the terminal device based on the first sample data and the second sample data, model training on a graphical model sent by a server;

acquiring, by the terminal device, gradient information corresponding to the trained graphical model; and sending, by the terminal device, the gradient information to the server for the server to update model parameters in the graphical model based on gradient information provided by different terminal devices to obtain an updated graphical model.

10. The non-transitory, computer-readable medium according to claim 9, wherein the predetermined fully connected network is a fully convolutional network (FCN), and the predetermined graph network is constructed based on a graph convolutional neural network (GCN), a graph attention network (GAT), or a GraphSAGE.

11. The non-transitory, computer-readable medium according to claim 9, wherein the constructing first sample data by using a predetermined InstaHide privacy protection rule comprises:

generating a permutation function and a weight that correspond to the first node based on the latent vector of the first node and the training label information corresponding to the first node;

generating first pre-selected sample data based on the permutation function and the weight that correspond to the first node, the latent vector of the first node, and the training label information corresponding to the first node;

generating a node parameter corresponding to the first node; and generating the first sample data based on the node parameter corresponding to the first node and the first pre-selected sample data.

12. The non-transitory, computer-readable medium according to claim 11, wherein a sum of weights corresponding to the first node is 1.

13. The non-transitory, computer-readable medium according to claim 9, wherein the performing, based on the first sample data and the second sample data, model training on a graphical model comprises:

performing model training on the graphical model based on the first sample data to obtain a function value of a predetermined first classification loss function corresponding to the first sample data; and performing model training on the graphical model based on the second sample data to obtain a function value of a predetermined second classification loss function corresponding to the second sample data; and wherein the acquiring gradient information corresponding to the trained graphical model comprises:

determining a function value of a loss function corresponding to the graphical model based on the function value of the predetermined first classification loss function corresponding to the first sample data and the function value of the predetermined second classification loss function corresponding to the second sample data; and determining gradient information corresponding to the trained graphical model based on the function value of the loss function corresponding to the graphical model.

14. The non-transitory, computer-readable medium according to claim 13, wherein the predetermined first classification loss function is same as the predetermined second classification loss function, and the predetermined first classification loss function is a cross-entropy loss function.

15. The non-transitory, computer-readable medium according to claim 9, wherein the generating training label information for a second node without training label information in the first graph and a node in the second graph comprises:

inputting node data of the second node without training label information in the first graph and node data of the node in the second graph into a predetermined target graph neural network (GNN) model, to obtain training label information corresponding to the second node without training label information in the first graph and the node in the second graph, wherein the predetermined target GNN model is obtained by performing supervised training based on a predetermined graph sample.

16. The non-transitory, computer-readable medium according to claim 9, wherein the graphical model is constructed based on a graph neural network (GNN).

17. A terminal device comprising:

one or more processors; and one or more memories coupled to the one or more processors and storing programming instructions for execution by the one or more processors for execution by the one or more processors to perform operations comprising:

acquiring node information of a first graph to be constructed, node information of a second graph and node connection information of the second graph;

constructing the first graph by using a predetermined fully connected network based on the node information of the first graph;

constructing the second graph by using a predetermined graph network based on the node information and the node connection information of the second graph, wherein the predetermined fully connected network and the predetermined graph network have same network parameters;

acquiring a latent vector of a first node that has training label information in the first graph;

constructing first sample data by using a predetermined InstaHide privacy protection rule based on the latent vector of the first node and the training label information corresponding to the first node;

generating training label information for a second node without training label information in the first graph and a node in the second graph;

acquiring latent vectors of the second node and the node in the second graph;

constructing second sample data by using the predetermined InstaHide privacy protection rule based on the latent vectors of the second node, the node in the second graph, and the generated training label information; and performing, based on the first sample data and the second sample data, model training on a graphical model sent by a server;

acquiring gradient information corresponding to the trained graphical model; and sending the gradient information to the server for the server to update model parameters in the graphical model based on gradient information provided by different terminal devices to obtain an updated graphical model.

18. The terminal device according to claim 17, wherein the predetermined fully connected network is a fully convolutional network (FCN), and the predetermined graph network is constructed based on a graph convolutional neural network (GCN), a graph attention network (GAT), or a GraphSAGE.

19. The terminal device according to claim 17, wherein the constructing first sample data by using a predetermined InstaHide privacy protection rule comprises:

generating a permutation function and a weight that correspond to the first node based on the latent vector of the first node and the training label information corresponding to the first node;

generating first pre-selected sample data based on the permutation function and the weight that correspond to the first node, the latent vector of the first node, and the training label information corresponding to the first node;

generating a node parameter corresponding to the first node; and generating the first sample data based on the node parameter corresponding to the first node and the first pre-selected sample data.

20. The terminal device according to claim 19, wherein a sum of weights corresponding to the first node is 1.

* * * * *